US012573312B2

(12) United States Patent
Meltzer et al.

(10) Patent No.: US 12,573,312 B2
(45) Date of Patent: *Mar. 10, 2026

(54) ELECTRONIC DOCUMENT PRESENTATION MANAGEMENT SYSTEM

(71) Applicant: SPOONREAD INC., Aptos, CA (US)

(72) Inventors: Bart Alan Meltzer, Corralitos, CA (US); Mayank V. Vadodaria, Cupertino, CA (US)

(73) Assignee: SPOONREAD INC., Aptos, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/807,883

(22) Filed: Aug. 16, 2024

(65) Prior Publication Data

US 2024/0412652 A1 Dec. 12, 2024

Related U.S. Application Data

(63) Continuation of application No. 17/671,509, filed on Feb. 14, 2022, now Pat. No. 12,067,900, which is a (Continued)

(51) Int. Cl.
*G06F 21/31* (2013.01)
*G06F 3/0483* (2013.01)
(Continued)

(52) U.S. Cl.
CPC ............. *G09B 5/12* (2013.01); *G06F 3/0483* (2013.01); *G06F 16/38* (2019.01); *G06F 16/382* (2019.01);
(Continued)

(58) Field of Classification Search
None
See application file for complete search history.

(56) References Cited

U.S. PATENT DOCUMENTS

| | | |
|---|---|---|
| 7,158,971 B1 | 1/2007 | Bascom |
| 7,191,332 B1 | 3/2007 | Pankajakshan et al. |

(Continued)

FOREIGN PATENT DOCUMENTS

| | | |
|---|---|---|
| CN | 106062812 A | 10/2016 |
| GB | 2444338 A | 6/2008 |

(Continued)

OTHER PUBLICATIONS

Esma Aïmeur, Hicham Hage and Flavien Serge Mani Onana (Anonymous Credentials for Privacy-Preserving E-learning); pp. 11; IEEE Published in (Year: 2008).*

(Continued)

*Primary Examiner* — Ali H. Cheema
(74) *Attorney, Agent, or Firm* — Haynes Beffel & Wolfeld LLP; Ernest J Beffel, Jr.; Jason Liao

(57) ABSTRACT

A method for managing engagement and presentation content of an electronic document involves providing container metadata identifying engagement containers within the electronic document, providing engagement data linked to the engagement containers, the engagement data comprising parameters of an engagement based on the segments of content in the linked engagement containers, executing a procedure to traverse engagement containers identified in the container metadata. The procedure includes accepting, based on user input, data responsive to the engagement, and assigning a score for the current engagement container based on the received data and the parameters defined in the engagement metadata.

22 Claims, 29 Drawing Sheets

Related U.S. Application Data continuation of application No. 17/037,523, filed on Sep. 29, 2020, now Pat. No. 11,250,718, which is a continuation of application No. 15/798,248, filed on Oct. 30, 2017, now Pat. No. 10,796,591.

(60) Provisional application No. 62/569,285, filed on Oct. 6, 2017, provisional application No. 62/484,275, filed on Apr. 11, 2017.

(51) Int. Cl.

| | |
|---|---|
| *G06F 16/38* | (2019.01) |
| *G06F 16/48* | (2019.01) |
| *G06F 40/106* | (2020.01) |
| *G06F 40/123* | (2020.01) |
| *G06F 40/131* | (2020.01) |
| *G06F 40/143* | (2020.01) |
| *G09B 5/02* | (2006.01) |
| *G09B 5/06* | (2006.01) |
| *G09B 5/12* | (2006.01) |
| *G09B 17/04* | (2006.01) |
| *G06F 21/62* | (2013.01) |

(52) U.S. Cl.

CPC .............. *G06F 16/48* (2019.01); *G06F 21/31* (2013.01); *G06F 40/106* (2020.01); *G06F 40/123* (2020.01); *G06F 40/131* (2020.01); *G06F 40/143* (2020.01); *G09B 5/02* (2013.01); *G09B 5/062* (2013.01); *G09B 17/04* (2013.01); *G06F 21/6218* (2013.01)

(56) References Cited

U.S. PATENT DOCUMENTS

| | | | |
|---|---|---|---|
| 7,324,972 B1 | 1/2008 | Oliver et al. | |
| 7,428,706 B2 | 9/2008 | Hagan et al. | |
| 7,783,986 B2 | 8/2010 | Barsness et al. | |
| 8,132,242 B1 | 3/2012 | Wu | |
| 8,281,149 B2 * | 10/2012 | Laurie ................... | H04L 9/3013 |
| | | | 713/168 |
| 8,812,364 B2 | 8/2014 | MacMillan et al. | |
| 8,904,181 B1 | 12/2014 | Felsher et al. | |
| 9,153,141 B1 | 10/2015 | Kane, Jr. et al. | |
| 9,258,279 B1 | 2/2016 | Rajkumar et al. | |
| 9,282,149 B2 | 3/2016 | Johnston | |
| 9,330,417 B2 * | 5/2016 | Moharram ............... | G09B 7/00 |
| 9,367,227 B1 | 6/2016 | Kim | |
| 9,413,710 B1 | 8/2016 | Saylor et al. | |
| 9,554,184 B2 | 1/2017 | Deo et al. | |
| 9,592,444 B2 | 3/2017 | Knutsson et al. | |
| 9,626,875 B2 * | 4/2017 | Gal .......................... | G09B 5/08 |
| 9,632,985 B1 | 4/2017 | MacInnis et al. | |
| 9,665,529 B1 | 5/2017 | Lattyak et al. | |
| 9,678,634 B2 | 6/2017 | Murray et al. | |
| 9,697,497 B2 | 7/2017 | Kessel et al. | |
| 10,297,106 B1 | 5/2019 | Simons | |
| 10,375,111 B2 | 8/2019 | Schultz et al. | |
| 2003/0005333 A1 | 1/2003 | Noguchi et al. | |
| 2003/0210226 A1 | 11/2003 | Ho et al. | |
| 2004/0067794 A1 | 4/2004 | Coetzee | |
| 2004/0234936 A1 | 11/2004 | Ullman et al. | |
| 2005/0287509 A1 | 12/2005 | Mohler | |
| 2006/0031683 A1 | 2/2006 | Marion et al. | |
| 2007/0060310 A1 | 3/2007 | Juds et al. | |
| 2007/0255661 A1 | 11/2007 | Yoshida et al. | |
| 2007/0266031 A1 | 11/2007 | Adams et al. | |
| 2007/0288513 A1 | 12/2007 | Jenkins et al. | |
| 2008/0182724 A1 * | 7/2008 | Guthrie ................. | A61B 5/1118 |
| | | | 482/8 |
| 2008/0222552 A1 | 9/2008 | Batarseh et al. | |
| 2008/0234047 A1 | 9/2008 | Nguyen | |
| 2008/0248875 A1 | 10/2008 | Beatty | |

| | | | |
|---|---|---|---|
| 2008/0293030 A1 | 11/2008 | Hixon et al. | |
| 2008/0319949 A1 | 12/2008 | Irving et al. | |
| 2009/0123903 A1 * | 5/2009 | Weitenberner .......... | G09B 7/00 |
| | | | 434/323 |
| 2009/0171982 A1 * | 7/2009 | Hagan ................. | G06F 21/6254 |
| 2010/0058054 A1 | 3/2010 | Irvine | |
| 2010/0233667 A1 | 9/2010 | Wilson et al. | |
| 2010/0235924 A1 | 9/2010 | Bulot et al. | |
| 2010/0241530 A1 | 9/2010 | Murset | |
| 2010/0325441 A1 | 12/2010 | Laurie et al. | |
| 2011/0029622 A1 | 2/2011 | Walker et al. | |
| 2011/0131418 A1 | 6/2011 | Teng et al. | |
| 2011/0257961 A1 | 10/2011 | Tinkler et al. | |
| 2012/0023101 A1 | 1/2012 | Heimendinger et al. | |
| 2012/0066088 A1 | 3/2012 | Murset | |
| 2012/0072416 A1 * | 3/2012 | Gowel .................... | G06F 9/453 |
| | | | 707/723 |
| 2012/0191545 A1 * | 7/2012 | Leibu ................. | G06Q 30/0269 |
| | | | 709/204 |
| 2012/0277004 A1 | 11/2012 | Moinuddin et al. | |
| 2013/0004935 A1 | 1/2013 | Smith et al. | |
| 2013/0007856 A1 | 1/2013 | Bennett et al. | |
| 2013/0031456 A1 | 1/2013 | Fu et al. | |
| 2013/0058262 A1 | 3/2013 | Parreira | |
| 2013/0073672 A1 | 3/2013 | Ayed | |
| 2013/0080471 A1 | 3/2013 | Forte et al. | |
| 2013/0117703 A1 | 5/2013 | Jang et al. | |
| 2013/0124953 A1 | 5/2013 | Fan et al. | |
| 2013/0179823 A1 | 7/2013 | Batarseh et al. | |
| 2013/0198327 A1 | 8/2013 | Szczepanek | |
| 2013/0298208 A1 | 11/2013 | Ayed | |
| 2013/0302767 A1 | 11/2013 | Hipskind | |
| 2013/0309648 A1 | 11/2013 | Park et al. | |
| 2013/0311870 A1 | 11/2013 | Worsley et al. | |
| 2014/0101057 A1 | 4/2014 | Oliver et al. | |
| 2014/0108914 A1 | 4/2014 | Qu | |
| 2014/0215341 A1 | 7/2014 | Fratti et al. | |
| 2014/0236772 A1 | 8/2014 | McCoy et al. | |
| 2014/0308638 A1 | 10/2014 | Stout et al. | |
| 2014/0315163 A1 | 10/2014 | Ingrassia, Jr. et al. | |
| 2014/0344951 A1 | 11/2014 | Brewer | |
| 2014/0380428 A1 | 12/2014 | Kobayashi | |
| 2015/0034716 A1 | 2/2015 | Rouchouze et al. | |
| 2015/0050632 A1 | 2/2015 | Sran | |
| 2015/0072321 A1 | 3/2015 | Cohen | |
| 2015/0073815 A1 | 3/2015 | Holmes et al. | |
| 2015/0163206 A1 | 6/2015 | McCarthy et al. | |
| 2015/0187225 A1 | 7/2015 | Worsley | |
| 2015/0199400 A1 | 7/2015 | Wu | |
| 2015/0216413 A1 | 8/2015 | Soyao et al. | |
| 2015/0237037 A1 | 8/2015 | Staker et al. | |
| 2015/0281225 A1 | 10/2015 | Schoen et al. | |
| 2015/0281229 A1 | 10/2015 | Kang et al. | |
| 2015/0324896 A1 | 11/2015 | Marson et al. | |
| 2015/0326550 A1 | 11/2015 | Schropfer et al. | |
| 2015/0346930 A1 | 12/2015 | Murray et al. | |
| 2015/0348185 A1 | 12/2015 | Frost et al. | |
| 2015/0356257 A1 | 12/2015 | Wright et al. | |
| 2016/0012744 A1 | 1/2016 | Rogers et al. | |
| 2016/0042654 A1 | 2/2016 | Fieldman | |
| 2016/0117953 A1 | 4/2016 | Lluch | |
| 2016/0154552 A1 | 6/2016 | Yerli | |
| 2016/0225224 A1 | 8/2016 | Nguyen et al. | |
| 2016/0259936 A1 | 9/2016 | Mukherjee et al. | |
| 2016/0292672 A1 | 10/2016 | Fay et al. | |
| 2016/0344861 A1 | 11/2016 | Lee et al. | |
| 2016/0379507 A1 * | 12/2016 | Reale .................... | G09B 5/125 |
| | | | 434/238 |
| 2017/0041296 A1 | 2/2017 | Ford et al. | |
| 2017/0134444 A1 | 5/2017 | Buckley et al. | |
| 2017/0177891 A1 | 6/2017 | Hampson et al. | |
| 2017/0294134 A1 | 10/2017 | Angel et al. | |
| 2017/0300200 A1 | 10/2017 | Chak et al. | |
| 2017/0337838 A1 * | 11/2017 | Elkon .................... | G06F 3/013 |
| 2018/0096130 A1 | 4/2018 | Purkiss et al. | |
| 2018/0121911 A1 | 5/2018 | Hallam et al. | |
| 2018/0189921 A1 | 7/2018 | Feng et al. | |
| 2018/0241751 A1 | 8/2018 | Kruse | |
| 2018/0247302 A1 | 8/2018 | Armstrong et al. | |

(56) References Cited

U.S. PATENT DOCUMENTS

| | | | |
|---|---|---|---|
| 2018/0268382 A1 | 9/2018 | Wasserman |
| 2019/0028276 A1 | 1/2019 | Pierce et al. |
| 2019/0114707 A1 | 4/2019 | McSheehan et al. |
| 2019/0130701 A1 | 5/2019 | Simons |
| 2019/0180558 A1 | 6/2019 | Merati |
| 2019/0221076 A1 | 7/2019 | Simons |
| 2019/0347725 A1 | 11/2019 | de Jong |
| 2019/0370457 A1 | 12/2019 | Shultz et al. |
| 2020/0027315 A1 | 1/2020 | Cotton |
| 2020/0065847 A1 | 2/2020 | Harrison et al. |
| 2020/0082733 A1 | 3/2020 | Meltzer et al. |
| 2020/0097991 A1 | 3/2020 | Pistilli et al. |
| 2020/0111279 A1 | 4/2020 | Cleveland et al. |
| 2020/0213292 A1 | 7/2020 | Cage et al. |
| 2020/0364720 A1 | 11/2020 | Lally et al. |
| 2021/0110652 A1 | 4/2021 | Schwartz |
| 2021/0350359 A1 | 11/2021 | Silverman |

FOREIGN PATENT DOCUMENTS

| | | | |
|---|---|---|---|
| GB | 2540726 A | 2/2017 |
| JP | 2017060836 A | 3/2017 |
| KR | 20160060611 A | 5/2016 |
| WO | 2014201551 A1 | 12/2014 |
| WO | 2015106448 A1 | 7/2015 |

OTHER PUBLICATIONS

Mohd Anwar and Jim Greer (Facilitating Trust in Privacy-Preserving E-Learning Environments); pp. 12; IEEE Published in (Year: 2012).*

U.S. Appl. No. 15/798,248—Office Action dated Sep. 20, 2019, 28 pages.

U.S. Appl. No. 15/798,248—Response to Office Action dated Sep. 20, 2019, filed Oct. 31, 2019, 22 pages.

U.S. Appl. No. 15/798,248—Office Action dated Feb. 4, 2020, 33 pages.

U.S. Appl. No. 16/685,685—Office Action dated Mar. 13, 2020, 26 pages.

U.S. Appl. No. 15/798,248—Response to Office Action dated Feb. 4, 2020, filed Apr. 6, 2020, 36 pages.

U.S. Appl. No. 15/798,248—Supplemental Response to Office Action dated Feb. 4, 2020, filed May 1, 2020, 40 pages.

U.S. Appl. No. 15/798,248—Notice of Allowance dated May 29, 2020, 30 pages.

U.S. Appl. No. 16/685,685—Response to Non-Final Office Action dated Mar. 13, 2020 filed Jun. 11, 2020, 25 pages.

U.S. Appl. No. 16/685,685—Office Action dated Jul. 21, 2020, 22 pages.

Solapurkar, Prajakta, "Building Secure Healthcare Services Using OAuth 2.0 and JSON Web Token in IOT Cloud Scenario", Published in: 2016, 2nd International Conference on Contemporary Computing and Informatics (IC3I); 6 Pages.

Au, Richard, "Consumer-Centric and Privacy-preserving Identity Management for Distributed e-Health Systems", Proceedings of the 41st Hawaii International Conference on System Sciences—2008, pp. 10.

Weerasinghe, Dasun, et. al., "Patient's privacy protection with anonymous access to medical services", Mobile Networks Research Group (School of Engineering and Mathematical Sciences), 2008, 4 Pages.

Dai et al., "Toward Blockchain-Based Accounting and Assurance," Journal of Information Systems, vol. 31, No. 3, Jun. 2017, 17 pages.

U.S. Appl. No. 16/832,759—Office Action dated Oct. 23, 2020, 31 pages.

U.S. Appl. No. 16/685,685—Office Action dated Jan. 4, 2021, 27 pages.

Yang, et. al., "A New Approach for Anonymous Password Authentication", 2009, 10 pages.

Anwar et al., "Facilitating Trust in Privacy-Preserving E-Learning Environments", IEEE Transactions on Learning Technologies, V.5, No. 1, pp. 62-73, Jan.-Mar. 2012.

Aimeur et al, "Anonymous Credentials for Privacy Preserving E-learning", IEEE_2008 International Mcetech Conference on e-Technologies, pp. 70-80, 2008.

U.S. Appl. No. 16/685,685—Response to Final Office Action dated Jun. 4, 2021 w/AFCP as filed Aug. 11, 2021, 19 pages.

U.S. Appl. No. 16/685,685—Final Office Action dated Jun. 4, 2021, 22 pages.

US Office Action in U.S. Appl. No. 16/685,685 dated Mar. 13, 2020, 19 pages.

US Office Action from U.S. Appl. No. 16/832,759 dated Oct. 23, 2020, 31 pages.

US Office Action from U.S. Appl. No. 16/832,759 dated Dec. 22, 2020, 26 pages.

Hearn et al, "Corda: A distributed ledger.", Corda Technical White Paper 2016 (2016), Aug. 20, 2019 (Aug. 20, 2019), retrieved on Mar. 22, 2021 (Mar. 22, 2021) from <https://www.r3.com/wp-content/uploads/2019/08/corda-technical-whitepaper-August-29-2019.pdf>, 48 pages.

PCT/US2021/014579—International Search Report and Written Opinion dated Apr. 6, 2021, 17 pages.

US Office Action from U.S. Appl. No. 16/832,759 dated Jun. 26, 2020, 35 pages.

US Response to Office Action from U.S. Appl. No. 16/832,759 dated Jun. 26, 2020 filed Jul. 30, 2020, 21 pages.

US Response to Office Action from U.S. Appl. No. 16/832,759 dated Oct. 23, 2020 filed Dec. 1, 2020, 19 pages.

US Response to Office Action from U.S. Appl. No. 16/832,759 dated Dec. 22, 2020 filed Feb. 5, 2021, 20 pages.

US Final Office Action from U.S. Appl. No. 16/832,759 dated May 10, 2021, 33 pages.

U.S. Appl. No. 16/685,685—Advisory Action dated Sep. 8, 2021, 11 pages.

U.S. Appl. No. 16/685,685—Request for Continued Examination w/Supplemental Response to Final Office Action dated Jun. 4, 2021 filed Sep. 3, 2021, 34 pages.

U.S. Appl. No. 16/685,685—Response to Office Action dated Jan. 4, 2021 filed Mar. 31, 2021, 24 pages.

U.S. Appl. No. 16/685,685—Response to Final Office Action dated Jul. 21, 2020 filed Oct. 19, 2020, 19 pages.

U.S. Appl. No. 16/685,685—Final Office Action dated Jul. 21, 2020, 22 pages.

U.S. Appl. No. 17/037,523—Notice of Allowance dated Oct. 6, 2021 with Supplemental Notice of Allowability dated Nov. 19, 2021, 46 pages.

U.S. Appl. No. 17/037,523—Notice of Allowance dated Oct. 6, 2021 with Supplemental Notice of Allowability dated Oct. 6 Nov. 19, 2021, 46 pages.

U.S. Appl. No. 16/685,685—Response to Office Action dated Jan. 4, 2021 filed Mar. 31, 2020, 24 pages.

U.S. Appl. No. 16/685,685—Response to Office Action dated Mar. 13, 2020, filed Jun. 11, 2020, 14 pages.

U.S. Appl. No. 16/685,685—Notice of Allowance mailed Oct. 5, 2021, 35 pages.

U.S. Appl. No. 16/685,685—Notice of Allowance dated Oct. 5, 2021, 35 pages.

Shao et al., "A Remote User Authentication Scheme Preserving User Anonymity and Traceability," 2009 5th International Conference on Wireless Communications, Networking and Mobile Computing. Sep. 24-26, 2009, 4 pages.

PCT/US2021/014579—International Preliminary Report on Patentability (IPRP) dated Aug. 4, 2022, 16 pages.

* cited by examiner

Fig. 3

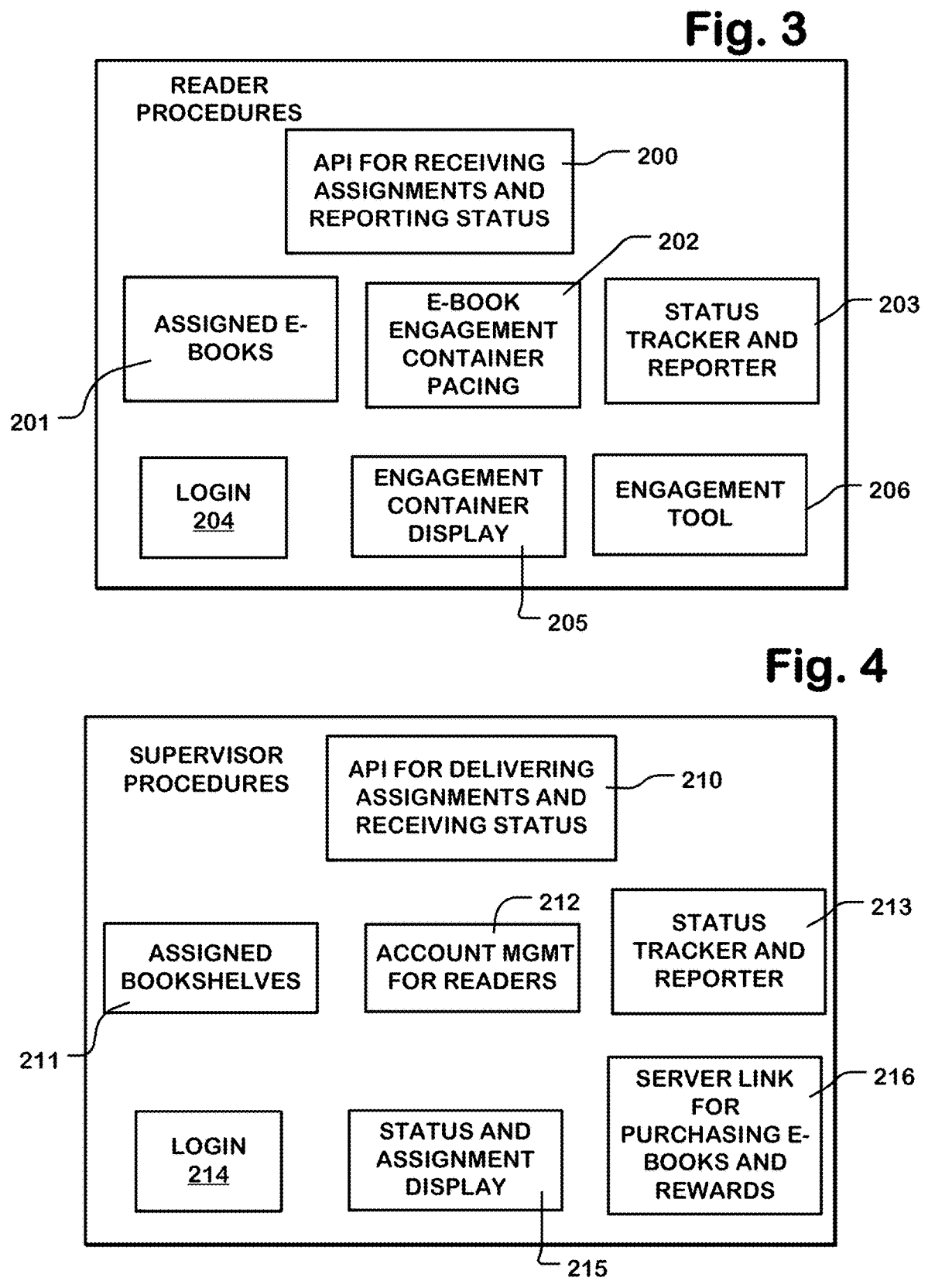

READER
PROCEDURES

API FOR RECEIVING ASSIGNMENTS AND REPORTING STATUS — 200

ASSIGNED E-BOOKS

201

E-BOOK ENGAGEMENT CONTAINER PACING — 202

STATUS TRACKER AND REPORTER — 203

LOGIN 204

ENGAGEMENT CONTAINER DISPLAY

ENGAGEMENT TOOL — 206

SUPERVISOR PROCEDURES

API FOR DELIVERING ASSIGNMENTS AND RECEIVING STATUS — 210

ASSIGNED BOOKSHELVES

211

ACCOUNT MGMT FOR READERS — 212

STATUS TRACKER AND REPORTER — 213

LOGIN 214

STATUS AND ASSIGNMENT DISPLAY

SERVER LINK FOR PURCHASING E-BOOKS AND REWARDS — 216

215

500

501

502

503

From Fig. 7A

From Fig. 8A

ADD ASSIGNMENT PARAMETERS (TIME OF DAY, PACE, UNIT SIZE, DUE DATE) — 810

ADD E-BOOK TO READER BOOKSHELF — 811

ENABLE READER APP? — 812
NO
YES

RECEIVE ONE TIME CODE — 813

SAME PLATFORM? — 814
NO
YES

INITIAL READER LOGIN, INSERT ONE TIME CODE — 815

DISPLAY ONE TIME CODE TO SUPERVISOR TO SHARE WITH READER — 816

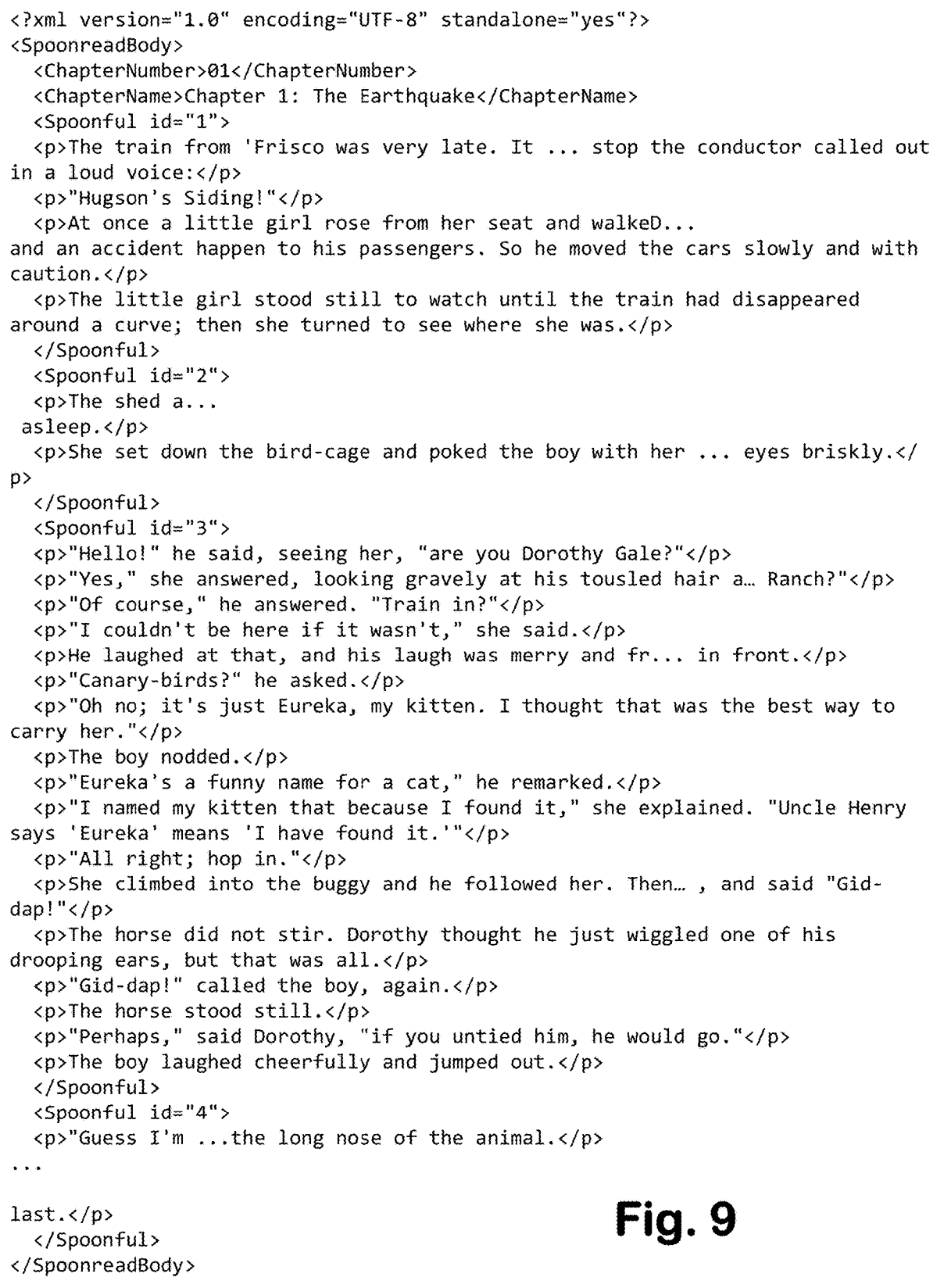

```xml
<?xml version="1.0" encoding="UTF-8" standalone="yes"?>
<SpoonreadBody>
  <ChapterNumber>01</ChapterNumber>
  <ChapterName>Chapter 1: The Earthquake</ChapterName>
  <Spoonful id="1">
  <p>The train from 'Frisco was very late. It ... stop the conductor called out
in a loud voice:</p>
  <p>"Hugson's Siding!"</p>
  <p>At once a little girl rose from her seat and walkeD...
and an accident happen to his passengers. So he moved the cars slowly and with
caution.</p>
  <p>The little girl stood still to watch until the train had disappeared
around a curve; then she turned to see where she was.</p>
  </Spoonful>
  <Spoonful id="2">
  <p>The shed a...
 asleep.</p>
  <p>She set down the bird-cage and poked the boy with her ... eyes briskly.</
p>
  </Spoonful>
  <Spoonful id="3">
  <p>"Hello!" he said, seeing her, "are you Dorothy Gale?"</p>
  <p>"Yes," she answered, looking gravely at his tousled hair a… Ranch?"</p>
  <p>"Of course," he answered. "Train in?"</p>
  <p>"I couldn't be here if it wasn't," she said.</p>
  <p>He laughed at that, and his laugh was merry and fr... in front.</p>
  <p>"Canary-birds?" he asked.</p>
  <p>"Oh no; it's just Eureka, my kitten. I thought that was the best way to
carry her."</p>
  <p>The boy nodded.</p>
  <p>"Eureka's a funny name for a cat," he remarked.</p>
  <p>"I named my kitten that because I found it," she explained. "Uncle Henry
says 'Eureka' means 'I have found it.'"</p>
  <p>"All right; hop in."</p>
  <p>She climbed into the buggy and he followed her. Then… , and said "Gid-
dap!"</p>
  <p>The horse did not stir. Dorothy thought he just wiggled one of his
drooping ears, but that was all.</p>
  <p>"Gid-dap!" called the boy, again.</p>
  <p>The horse stood still.</p>
  <p>"Perhaps," said Dorothy, "if you untied him, he would go."</p>
  <p>The boy laughed cheerfully and jumped out.</p>
  </Spoonful>
  <Spoonful id="4">
  <p>"Guess I'm ...the long nose of the animal.</p>
...

last.</p>
  </Spoonful>
</SpoonreadBody>
```

Fig. 9

Q&A Structure:

```
<?xml version="1.0" encoding="UTF-8" standalone="yes"?>
<Validation>
  <Chapter id="1">
    <Spoonful id="1">
      <Question id="1" type="MultipleChoice" answer="3">
        <q>What was tucked under the girl's arm?</q>
        <a id="1">a parrot</a>
        <a id="2">a pillow</a>
        <a id="3">a parasol</a>
        <a id="4">a teddy bear</a>
        <renderToDom>true</renderToDom>
      </Question>
    </Spoonful>
    <Spoonful id="2">
      <Question id="1" type="MultipleChoice" answer="1">
        <q>The_____seemed almost new, for it had a shiny top and side
curtains.</q>
        <a id="1">buggy</a>
        <a id="2">cart</a>
        <a id="3">wagon</a>
        <a id="4">Prius</a>
        <renderToDom>true</renderToDom>
      </Question>
    </Spoonful>
    <Spoonful id="3">
      <Question id="1" type="MultipleChoice" answer="2">
        <q>What does Dorothy carry in her bird cage?</q>
        <a id="1">parakeet</a>
        <a id="2">kitten</a>
        <a id="3">puppy</a>
        <a id="4">hamster</a>
      </Question>
    </Spoonful>
...
</Chapter>
</Validation>
```

Fig. 10

```
CREATE TABLE tbl_book (
      book_id
      title
      sub_title
      author_id
      digital_id
      short_desc
      long_desc
      edition
      pub_date
      added_date
      book_level
      ref_book_status_id
      ref_book_purchase_type_id
      price
      rating
      cover_image_url
      content_file_name
      validation_metadata
      chapter_cnt
      spoonful_cnt
      word_cnt
      question_cnt
      ref_publisher_id
      is_content_final

```
CREATE TABLE tbl_book_chapter (
     book_chapter_id
     book_id
     chapter_id
     chapter_file_name
     chapter_content
     validation_metadata
     spoonful_count
     word_count_info
...
);
```

Fig. 13

```
CREATE TABLE tbl_child_current_reward (
     current_reward_id
     child_id
     org_reward_id
     ref_reward_status_id
     requested_date
     approved_date
     claimed_date
     fulfilled_date
     denied_date
     points_needed
     points_redeemed
...
);
```

Fig. 14

```
CREATE TABLE tbl_child (
    child_id
        user_id
        parent_id
        age
        grade_level
        ref_reading_level_id
        ref_spelling_performance_level_id
        ref_comprehension_performance_level_id
        ref_vocabulary_performance_level_id
        favorite_movie
        favorite_book1
        favorite_book2
        favorite_book3
        favorite_genres
        verification_code
        code_exp
        points_earned
        points_redeemed
        points_available
        crystals_counter
    ...
);
```

Fig. 15

```
CREATE TABLE tbl_child_lib (
    child_lib_id
    child_id
    org_lib_id
    due_date
    unit                ???
    num_units
    freq_in_days
    delivery_interval_in_mins
    delivery_start_time
    delivery_end_time
    assignment_date
    reading_start_date
    read_time
    read_percentage
    score
    chapter_counter
    spoonful_counter
    word_counter
    question_counter
    accuracy_index
    has_completed
    completion_date
    ...
);
```

Fig. 16

```
CREATE TABLE tbl_spoonful_tracking (
    spoonful_tracking_id
    tracking_date
    child_id
    org_lib_id
    chapter_id
    spoonful_id
    question_id
    total_attempts
    successful_attempts
    read_time
    points_value
...
);
```

Fig. 17

```
CREATE TABLE tbl_spoonful_progress (
    spoonful_progress_id
    progress_date
    child_id
    org_lib_id
    num_units_completed
...
);
```

Fig. 18

SPOONREAD

Book List

Book Status    All

| # | Book Name | Author | Book Status | Chapters | Segments |
|---|-----------|--------|-------------|----------|----------|
| 1 | Oedipus the King | Richard Jebb | Validation In Progress | 1 | 84 |
| 2 | The Tragedy of Julius Caesar | William Shakespeare | Published | 5 | 177 |
| 3 | Appley Dapply's Nursery Rhymes | Beatrix Potter | Published | 1 | 14 |
| 4 | Cecily Parsley's Nursery Rhymes | Beatrix Potter | Published | 1 | 14 |
| 5 | The Story of Miss Moppet | Beatrix Potter | Published | 1 | 14 |
| 6 | The Tale of Johnny Town-Mouse | Beatrix Potter | Published | 1 | 26 |
| 7 | The Tale of Timmy Tiptoes | Beatrix Potter | Published | 1 | 26 |
| 8 | The Tale of Mrs. Tittlemouse | Beatrix Potter | Published | 1 | 26 |
| 9 | The Tale of Jemima Puddle-Duck | Beatrix Potter | Published | 1 | 26 |
| 10 | The Tale of Ginger and Pickles | Beatrix Potter | Published | 1 | 26 |
| 11 | The Story of A Fierce Bad Rabbit | Beatrix Potter | Published | 1 | 14 |
| 12 | The Tale of The Flopsy Bunnies | Beatrix Potter | Published | 1 | 26 |
| 13 | The Tale of Tom Kitten | Beatrix Potter | Published | 1 | 26 |
| 14 | The Tale of Mr. Jeremy Fisher | Beatrix Potter | Published | 1 | 26 |
| 15 | The Pie and the Patty-Pan | Beatrix Potter | Published | 1 | 23 |
| 16 | The Tale of Mrs. Tiggy-Winkle | Beatrix Potter | Published | 1 | 26 |
| 17 | The Tale of Two Bad Mice | Beatrix Potter | Published | 1 | 26 |
| 18 | The Tailor of Gloucester | Beatrix Potter | Published | 1 | 26 |
| 19 | Robinson Crusoe | Daniel Defoe | Validation In Progress | 20 | 808 |
| 20 | Grimm's Household Tales, Volume 1 | Jacob Grimm | Published | 4 | 41 |
| 21 | Cinderella or the Little Glass Slipper | George Dalziel | Published | 1 | 6 |
| 22 | The Swiss Family Robinson | Johann Wyss | Validation In Progress | 16 | 652 |
| 23 | Rebecca of Sunnybrook Farm | Kate Wiggin | Content In Progress | 31 | 374 |
| 24 | White Fang | Jack London | Content In Progress | 25 | 401 |
| 25 | Just So Stories | Rudyard Kipling | Validation In Progress | 12 | 175 |
| 26 | Heidi | Johanna Spyri | Content In Progress | 23 | 441 |
| 27 | Black Beauty | Anna Sewell | Content In Progress | 49 | 292 |
| 28 | The Book of Dragons | Edith Nesbit | Validation In Progress | 8 | 204 |

Fig. 20

●   Not Initialized = not started

●   Content in Progress = SpoonFul Generation

●   Validation in progress = Questions and Answers

●   Published = pushed out to book store

SPOONREAD

Home    Book List    Treasure Island

Edit Book Info

| | |
|---|---|
| Title | Treasure Island |
| Author Name | Robert Stevenson |
| SubTitle | Enter SubTitle |
| Status | Published |
| Short Description | Gold! Pirates! Treachery! Robert Louis Stevenson's thrilling tale of adventure on the high seas has it all. Join the young Jim Hawk |
| Long Description | Gold! Pirates! Treachery! Robert Louis Stevenson's thrilling tale of adventure on the high seas has it all. Join the young Jim Hawk |
| Edition | Enter Edition |
| Digital Id | Enter Digital Id |
| Book Level | 8.3 |
| Book Purchase Type | Free |
| Price | 0 |
| Rating | 3.5 |
| Cover Image Url | http://spoon-read.com:3000/images/cover_image/7/TreasureIsland.jpg |
| Chapter Count | 34 |
| Word Count | 67527 |
| Question Count | 374 |
| Paragraph Count | 374 |
| Content file upload | Browse...   No file selected. |
| Validation Metadata | |

Fig. 23

SPOONREAD

Home : Books : Add Book

Add Book

| | |
|---|---|
| Title | Title |
| Sub Title | Sub Title |
| Short Description | Short Description |
| Long Description | Long Description |
| Edition | Edition |
| Book Level | Book Level |
| Image | Browse... No file selected. |
| Chapter Count | Chapter Count |
| Paragraph Count | Paragraph Count |
| Word Count | Word Count |
| Question Count | Question Count |
| Author | Select Author |
| Book Genre | Select Genre |
| Book Status | Not Initialized |
| Purchase Type | Free |
| Price | Price |
| Rating | Rating |

Fig. 24

SPOONREAD

Home | Book List | Treasure Island | Volumes

Chapters

| # | Chapter Name | Spoonful Count |
|---|---|---|
| 1 | Chapter01 | 12 |
| 2 | Chapter02 | 11 |
| 3 | Chapter03 | 12 |
| 4 | Chapter04 | 12 |
| 5 | Chapter05 | 10 |
| 6 | Chapter06 | 12 |
| 7 | Chapter07 | 10 |
| 8 | Chapter08 | 10 |
| 9 | Chapter09 | 9 |
| 10 | Chapter10 | 11 |
| 11 | Chapter11 | 11 |
| 12 | Chapter12 | 10 |
| 13 | Chapter13 | 9 |
| 14 | Chapter14 | 11 |
| 15 | Chapter15 | 12 |
| 16 | Chapter16 | 9 |
| 17 | Chapter17 | 8 |
| 18 | Chapter18 | 8 |
| 19 | Chapter19 | 11 |
| 20 | Chapter20 | 10 |
| 21 | Chapter21 | 11 |
| 22 | Chapter22 | 11 |
| 23 | Chapter23 | 9 |
| 24 | Chapter24 | 11 |
| 25 | Chapter25 | 9 |
| 26 | Chapter26 | 18 |
| 27 | Chapter27 | 12 |
| 28 | Chapter28 | 18 |
| 29 | Chapter29 | 12 |

SPOONREAD

Home   Book List   Treasure Island   Validation   Chapter-1   Spoonful-1

```
<Spoonful id="1">
<p><br/> Squire Trelawney, Dr. Livesey, and the rest of these gentlemen having
asked me to write down the whole particulars about Treasure Island, from the begi
nning to the end, keeping nothing back but the bearings of the island, and that o
nly because there is still treasure not yet lifted, I take up my pen in the year
of grace 17—, and go back to the time when my father kept the "Admiral Benbow" i
nn, and the brown old seaman, with the sabre cut, first took up his lodging under
our roof.</p>
<p>I remember him as if it were yesterday, as he came plodding to the inn door,
his sea-chest following behind him in a hand-barrow; a tall, strong, heavy, nut-b
rown man; his tarry pigtail falling over the shoulders of his soiled blue coat; h
is hands ragged and scarred, with black, broken nails; and the sabre cut across o
ne cheek, a dirty, livid white. I remember him looking round the cove and whistli
ng to himself as he did so, and then breaking out in that old sea-song that he sa
ng so often afterwards:</p>
<p>"Fifteen men on the dead man's chest—<br/> Yo-ho-ho, and a bottle of rum!"
</p>
</Spoonful>
```

Question: Where did the brown old seaman take up lodging?

Answer 1 : Squire Trelawney's residence

Answer 2 : Admiral Benbow Inn

Answer 3 : Treasure Island

Answer 4 : Livesey Inn

Correct Answer: 2

ELECTRONIC DOCUMENT PRESENTATION MANAGEMENT SYSTEM

PRIORITY APPLICATIONS

This application is a continuation of U.S. non-provisional patent application Ser. No. 17/671,509, entitled "ELECTRONIC DOCUMENT PRESENTATION MANAGEMENT SYSTEM", filed Feb. 14, 2022, which is a continuation of U.S. non-provisional patent application Ser. No. 17/037,523, entitled "ELECTRONIC DOCUMENT PRESENTATION MANAGEMENT SYSTEM", filed Sep. 29, 2020, which is a continuation of U.S. non-provisional patent application Ser. No. 15/798,248, entitled "ELECTRONIC DOCUMENT PRESENTATION MANAGEMENT SYSTEM", filed Oct. 30, 2017, which claims the benefit of U.S. Provisional Patent Application No. 62/569,285, entitled "ELECTRONIC DOCUMENT PRESENTATION MANAGEMENT SYSTEM", filed Oct. 6, 2017, and U.S. Provisional Patent Application No. 62/484,275, entitled "SPOONREAD SYSTEMS AND METHODS", filed Apr. 11, 2017. The Non-Provisional and Provisional applications are incorporated herein by reference.

REFERENCE TO COMPUTER PROGRAM LISTING APPENDIX

A computer program listing appendix submitted electronically via EFS-Web in ASCII text accompanies this application and is incorporated by reference. The name of the ASCII text file is "SPRD_Computer_Program_Appx," created on Oct. 25, 2017 and is 12,416 bytes.

BACKGROUND

Technological Field

The invention generally relates to the field of electronic books (e-books) and in particular to a framework for tools for interacting with e-books and other electronic documents.

Description of Related Art

E-books have become an important channel for distribution of publications, including fiction and non-fiction literature of virtually all types. The technology is adaptable to enable linking of many types of enrichment tools to content of the publications, including dictionaries, internet searching tools, text searching tools, advertising channels, and so on. See for example U.S. Pat. No. 9,678,634, entitled EXTENSIBLE FRAMEWORK FOR EREADER TOOLS, by Murray et al., issued 13 Jun. 2017.

One limitation on growth of e-book publishing arises with respect to use in an educational context, including use by children. Also, other than some special purpose e-readers, the platforms used for reading the e-books are often mobile phones and tablets that are not well adapted to the display of content from e-books. It is desirable for example to display segments of the e-books in a way that preserves literary integrity expressed by the author in paragraph and chapter boundaries of the text. However, the limited display available on a portable phone, for example, can present a technological limit on the segment displayed in terms of having a large enough font for the reader and a portion of the text that can express a substantial fact or concept in the work. The widely variant sizes of paragraphs and chapters as formed by the authors makes these literary boundaries unsuited in a technological sense to be utilized for defining the segment of the work being displayed on these kinds of platforms. This incongruity contributes to discomfort and inefficiency in the reading experience, and deters use of small format displays.

It is desirable to provide a technology than can extend the use of e-books for children, in educational contexts and on mobile devices.

SUMMARY

A technology is described for managing engagement and presentation of an electronic document such as an e-book in a way that makes it both efficient on small platform devices, and engaging in a way that can encourage use of the devices. The technology includes an electronic document including metadata that partitions the electronic document for engagement using a reader application, and a computer system architecture solving problems related to validating traversal of electronic documents in computer systems, and supporting utilization of the electronic document in a game-like process.

A computer executed reader application is described that utilizes the electronic document and metadata, and manages presentation of the content of the electronic document. The reader application in an embodiment described herein executes a process that includes retrieving an electronic document including content and container metadata. The container metadata identifies engagement containers within the electronic document that comprise respective segments of the content. The container metadata is metadata that is distinct from or in addition to metadata that identifies literary boundaries, such as paragraph and chapter boundaries. The procedure also includes retrieving engagement data linked to the engagement containers in the electronic document. The engagement data comprises parameters of an engagement based on the segments of content in the linked engagement containers. The engagement defined by the engagement data comprises a user interface sequence by which a reader validates review of the segment of content, such as a challenge/response (e.g, question and answer) sequence, based on content of the linked engagement container. The reader application includes a procedure to traverse engagement containers identified in the container metadata of a particular electronic document. The procedure includes for a current engagement container, displaying content of the current engagement container on the display, and accepting from user input at the platform, an engagement signal for initiation of engagement of the current engagement container, such as by clicking a button on a touchscreen interface to indicate that the reader has reviewed the content. The procedure includes, after receipt of the engagement signal for the current engagement container, enabling an engagement tool on the platform. The engagement tool presents prompts on the display for the engagement based on the parameters defined in the engagement data linked to the current engagement container. The procedure then accepts user input at the platform in response to the prompts presented in the engagement. After receipt of the data in response to the prompts, the procedure selects a next engagement container in the electronic document, and can assign points for the current engagement container based on the received data and the parameters defined in the engagement data. Also, the procedure sends a notification to the server-side node validating traversal of the current engagement container.

The reader application can include a pacing procedure used to enable display of a selected engagement container. Thus, in selection of a next engagement container, the pacing procedure is applied. The pacing procedure retrieves parameters defining an assigned pace for completing the particular electronic document, such as a target assignment completion date or a specified number of chapters or paragraphs in the document. Also, the pacing procedure can apply parameters defining a time of day during which access to the particular electronic document is allowed. The pacing procedure can enable or disable presentation of a selected engagement container based on the pacing parameters. Thus, if the selection of the current engagement container occurs outside the allowed time of day, then the reader procedure can present a notice to the reader indicating that access is prevented during this time. Also, if the reader procedure has traversed a number of engagement containers that correspond with an assigned number of chapters or paragraphs to be read in a given day or other time period, then the reader procedure can present a notice to the reader indicating that access is prevented because of the pacing limitations.

A computer system architecture described herein comprises a server application executed using one or more server-side nodes, and two types of applications executed on client-side nodes. One of the types of client-side applications is characterized as a supervisor application controlled for example by a parent, teacher or tutor, and the other type of client-side applications is characterized as a reader application utilized by a student or child to read the electronic document.

The server-side node executes a server application including computer programs and database tools for executing a server process. The server process includes maintaining access to a library of electronic documents, such as e-books, that include content and container metadata in addition to markup like paragraph and chapter boundaries. The container metadata identifies engagement containers within the electronic document that comprise respective segments of the content. This process also includes maintaining access to engagement data for the electronic documents in the library. The engagement data is linked to the engagement containers in the electronic documents and comprises parameters of an engagement based on the segment of content in the linked engagement containers. Engagement defined by the engagement data can comprise a question and a response, where the system at the reader presents the question as a prompt or challenge in the display, and the user inputs the answer as a response to the challenge, to validate that a reader had reviewed the segment of content defined by the linked engagement container.

The process executed at the server can include maintaining supervisor account records. The supervisor account records identify a set of reader accounts under supervision. The process executed at the server can also include maintaining reader account records. The reader account records can store identifiers of electronic documents assigned to the reader accounts, and indications of progress in the assigned electronic documents that is determined by monitoring the engagement on each engagement container.

The server application can include executing an application program interface including parameters and procedures executed using the server-side node by communication with a network node or network nodes executing supervisor applications and reader applications.

The API can include a procedure or procedures in communication with the supervisor applications that add reader accounts to the set of reader accounts in the supervisor account record, to add particular electronic documents to the reader accounts in the set of reader accounts, to add parameters of assignments of the particular electronic documents to reader accounts and provide access to a particular supervisor application to reader account records of reader accounts added by the particular supervisor application.

The API can include a procedure or procedures in communication with the reader applications to provide access to the particular electronic documents in the reader accounts, to provide access to the engagement data for the particular electronic documents in reader accounts, to deliver parameters of the assignments of particular electronic documents in the reader accounts, to deliver parameters indicating progress in the assigned electronic documents, and to receive notifications from the reader applications of progress in the particular assigned electronic documents.

According to a configuration described herein, the system includes a supervisor application having a unique login, and a reader application configured for use by a child or student without sharing personal identifying information with the presentation system in general. The system is configured for traversing the electronic document in a manner that enables validation of progress and promotes engagement by the reader, and a server which maintains data sets used for delivering electronic documents, tracking progress in the electronic documents by the readers, delivering status information to the supervisor application and to the reader application.

These tools are configured to manage presentation of electronic documents in the manner of running computer implemented games, where the games involve traversing electronic documents, including presenting content to the readers in "spoonfuls," performing engagement exercises linked to the spoonfuls that validate reading of the electronic documents, and executing algorithms for awarding points based on the quality and success of the performance of engagement exercises.

The supervisor application in an embodiment described herein includes tools for assigning electronic documents to specific reader apps under its supervision. Also, the supervisor application enables the establishment of performance parameters, such as the amount of time within which completion of the reading of the electronic document must be completed, time of day windows in which the reader application can be engaged, and other performance parameters. The supervisor application also enables assigning rewards to readers that encourage engagement with the assigned electronic documents.

The procedure at the reader application includes notifying the server of progress through the electronic document, including the engagement containers reviewed, the score assigned to each engagement container, the time duration in which the engagement container was displayed, and other parameters of the engagement.

Embodiments of the technology include maintaining an accumulated point total for the electronic document by combining the points awarded upon validation of the engagement containers traversed. The points can have positive or negative values depending on parameters specified for the engagement by the engagement metadata. There can be a plurality of engagement types presented by the engagement tool, where the engagement data can assign an engagement type to linked engagement containers.

In support of the presentation system, a delivery mechanism is provided herein that is embedded inside the electronic document using metadata tags to define engagement containers which enclose a "spoonful" of content. The system includes data structures binding the engagement containers to engagement data such as questions and answers and other components associated with the spoonful that support the presentation. Images, paragraph, chapter and other style features designed by the author and related to the literary integrity of the electronic document can be left unaltered in the electronic document overlaid by the metadata described herein that supports the engagement process during presentation.

In an embodiment described, different access authorization procedures are used for access to the reader account record and access to the supervisor account record.

In a system described herein, an application program interface API comprising a set of parameters and procedures is implemented by a server with complementary procedures in the supervisor application and the reader app, enabling the server to communicate with a supervisor application and a reader application to support presentation of the electronic document, to maintain data about status of electronic documents, and to support maintenance and delivery of engagement parameters. In this manner, progress in the electronic documents is maintained apart from the reader app, enabling portability of the engagement with the electronic document from platform to platform without loss of status information, and enabling real-time and off-time monitoring of progress using the supervisor application.

Implementation of the technology described herein includes storage of computer programs in memory, based on a non-transitory data storage medium or data storage media, the computer programs configured for execution by data processors to perform the procedures of one or more of the supervisor app, the reader application and the server. In some embodiments, the memory is part of a network node configured to execute one or more of the procedures described herein. In other embodiments, the memory is a portable memory device.

Other aspects and advantages of the technology described herein can be seen on review of the drawings, the detailed description and the claims, which follow.

BRIEF DESCRIPTION OF THE DRAWINGS

FIG. 3 is a simplified diagram of procedures of a reader application in an embodiment described herein.

FIG. 4 is a simplified diagram of procedures in a supervisor application in an embodiment described herein.

FIG. 9 illustrates an example portion of an electronic document, with engagement container metadata.

FIG. 10 illustrates an example of engagement data linked to engagement containers in an electronic document, such as that of FIG. 9.

FIGS. 12, 13, 14, 15, 16, 17 and 18 illustrate contents of data structures in FIG. 11, for one example implementation.

FIGS. 20-31 are screen shot images of a user interface for an editor application used in support of assigning container metadata and engagement data for electronic documents as described herein, and in which:

FIG. 20 illustrates display of a book list based on data retrieved using the API from the server indicating information about the electronic documents, including book status.

FIG. 21 illustrates a pulldown menu for optional book status entries using the editor application, including a "not initialized" status for electronic documents for which the editing process has not started, a "content in progress" status for electronic documents for which the generation of the container metadata identifying spoonfuls is in progress, a "validation in progress" status for which the generation of validation data, such as questions and answers, linked to the engagement containers is in progress, and a "published" status indicating that the electronic document is ready for use in the presentation system.

FIG. 22 illustrates content derived from the server for information about an e-book which can be edited using the editor app.

FIG. 23 shows a user interface enabling editing of the book information.

FIG. 24 shows a user interface supporting entry of additional books into the system.

FIG. 25 illustrates menus for selecting or editing information about chapters in e-books.

FIG. 26 is a screenshot supporting the adjustment of, or addition of, engagement container metadata to an electronic document by the editor app.

FIG. 27 is like FIG. 26, showing that the editor app can enforce editing rules that define locations in which splitting of an engagement container are allowed or not allowed.

FIG. 28 illustrates menus for selecting chapters and spoonfuls for the purposes of adding or editing validation data.

FIG. 29 illustrates menus for selecting spoonfuls after selection using the menu of FIG. 28, for the purposes of adding or editing engagement data.

FIG. 30 illustrates a display of content of an engagement container along with engagement data with tools prompting editing of the engagement data.

FIG. 31 shows display of a user input screen configured for entry of engagement data based on questions and multiple choice answers which can be linked to corresponding engagement containers.

DETAILED DESCRIPTION

Figure 1:
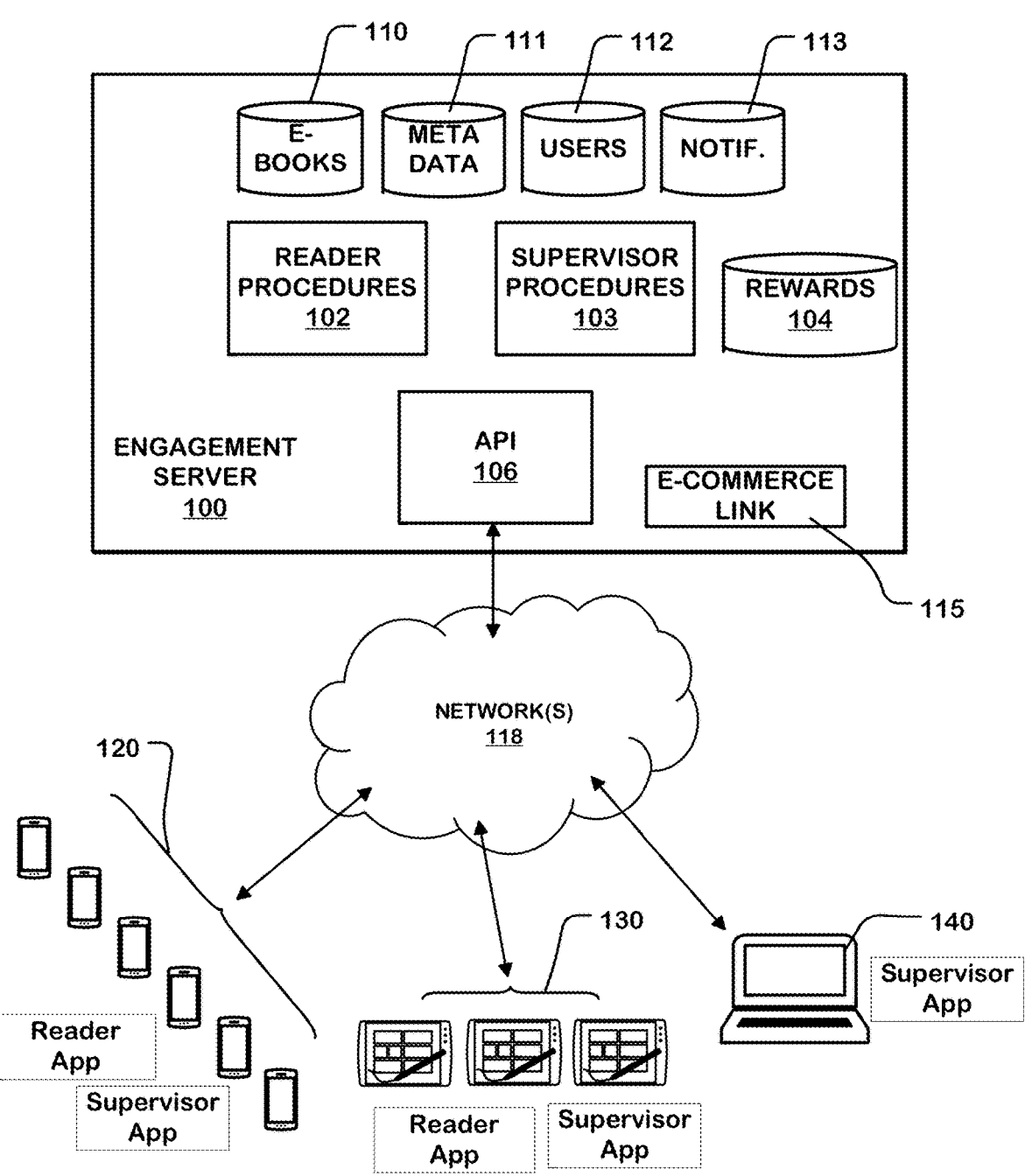
FIG. 1 is a network perspective diagram illustrating configuration of a system for managing presentation of electronic documents based on engagement containers as described herein.

A detailed description of embodiments of the technology is provided with reference to the FIGS. 1-31.

A flexible technology platform that chunks content and generates an engagement to validate and confirm comprehension is described herein. The platform provides for frequent, embedded, real-time monitoring of understanding which can dramatically increase the impact and efficacy of student's later studying and final review. Also, the platform provides a combination of embedded comprehension checks with study and final review, which is highly effective for both fiction and non-fiction content.

The electronic document presentation system described herein provides a computer implemented device around reading, many of the layers of which come together to create the look of a game. Turning the book into the core of the game can be expressed in the following algorithm.

$$(MobileDeviceType + MobileDeviceMetaData + Book + Book\ MetaData = MethodOfValidation \cdot Variation\ OfMethodOfValidation)$$

The combinatorial effect of executing the object "MethodOfValidation" creates engagement with the electronic document that encourages reading. "VariationOfMethodOfValidation" creates an infinite number of possibilities for validation of reading which constitutes game activity.

Game activity is on a per "spoonful," per chapter, and per book basis, where a spoonful is a segment of content identified by container metadata that is distinct from and in addition to metadata identifying boundaries set by an author that preserve literary integrity like paragraphs and chapters. The outcome of the validation process has direct influence on points gained or lost in the game, and transcends any single book. Therefore, moving through e-books, is like moving through levels of a game or rooms in an adventure game where each e-book is the room. Each e-book is its own discrete play activity but feeds into the larger total of points thereby making traversing the e-book the primary object of the game.

The validation process can be equivalent to bullets in a single person shooter genre game. An action by a player either gets validated (dodge the bullet) or fails the validation (get hit by the bullet) so both positive and negative emotions of a game are generated along with adding and subtracting of points for getting hit by or dodging a bullet.

Then, it can be said that the game results are derived using the following formula:

$$SINGULAR\_RESULT = MethodOfValidation \cdot VariationOfMethodOfValidation$$

Where,
SINGULAR_RESULT:
    Pass=Full Points
    Fail=Partial Points|No Points
So that
CUMULATIVE_RESULT=SINGULAR_RESULT++
[key: ++ means incremented based on itself]
Then, When
CUMULATIVE_RESULT>=PRIZE_BOUNTY
    GAME_STATUS=WON
If CUMULATIVE_RESULT<PRIZE_BOUNTY
GAME_STATUS=IN_PROGRESS Additionally,
SINGULAR_RESULT<SINGULAR_RESULT_
    PERFORMANCE_METRIC
LIFE_LEVEL=LIFE_LEVEL−1 (There can be an overall heartbeat that stays steady with good validation results and decreases with poor validation results, after losing health it is possible to gain health back with good reading)
SINGULAR_RESULT<SINGULAR_RESULT_
    PERFORMANCE_METRIC $$LIFE\_LEVEL = LIFE\_LEVEL + 1$$

The LIFE_LEVEL in the game is also a hook back into the messaging part of the app, for example, if LIFE_LEVEL increases and decreases are trending certain ways, inspirational messages can be sent to the reader.

IF        LIFE_LEVEL_DELTA_TRIGGER=TREND_
    DESCRIPTOR
THEN SEND_INSPIRATIONAL_MESSAGE

FIG. 1 is a network perspective of a system for presentation of electronic documents as described herein. The network includes a network node configured to execute an engagement server 100 coupled via a network 118 such as the Internet with a plurality of network nodes configured to execute reader applications and supervisor applications. The network nodes executing the reader applications and the supervisor applications can comprise smart phones 120, tablets 130, laptop or personal computers 140, and other computer systems coupled to the network 118. The system is configured for presentation of the content using the reader application, assignment and tracking of the progress using the supervisor application, and management of the data and administration of the system using the server 100.

In FIG. 1, components of the server 100 are illustrated. In this example, the server includes an API 106 for coordinating utilization of a set of reader procedures 102 supporting the reader application, and a set of supervisor procedures 103 supporting the supervisor application. Also, the server 100 includes data sets 110, 111 in support of the system. The data sets in this example includes a data set 110 of electronic documents such as e-books and a data set 111 including metadata supporting the presentation of the electronic documents including container metadata, and engagement data and metadata as described herein. Also the data set includes files maintaining user accounts 112 for readers and supervisors, and files for managing notifications 113 among the elements of the system. Also, the system includes files identifying rewards made available to users of the applications. The server 100 in this example maintains an e-commerce link 115 which can be engaged for the purposes of acquiring electronic documents such as e-books from publishers, and acquiring or fulfilling the delivery of rewards earned in some embodiments by accumulating points authorized by the supervisor application.

Figure 2:
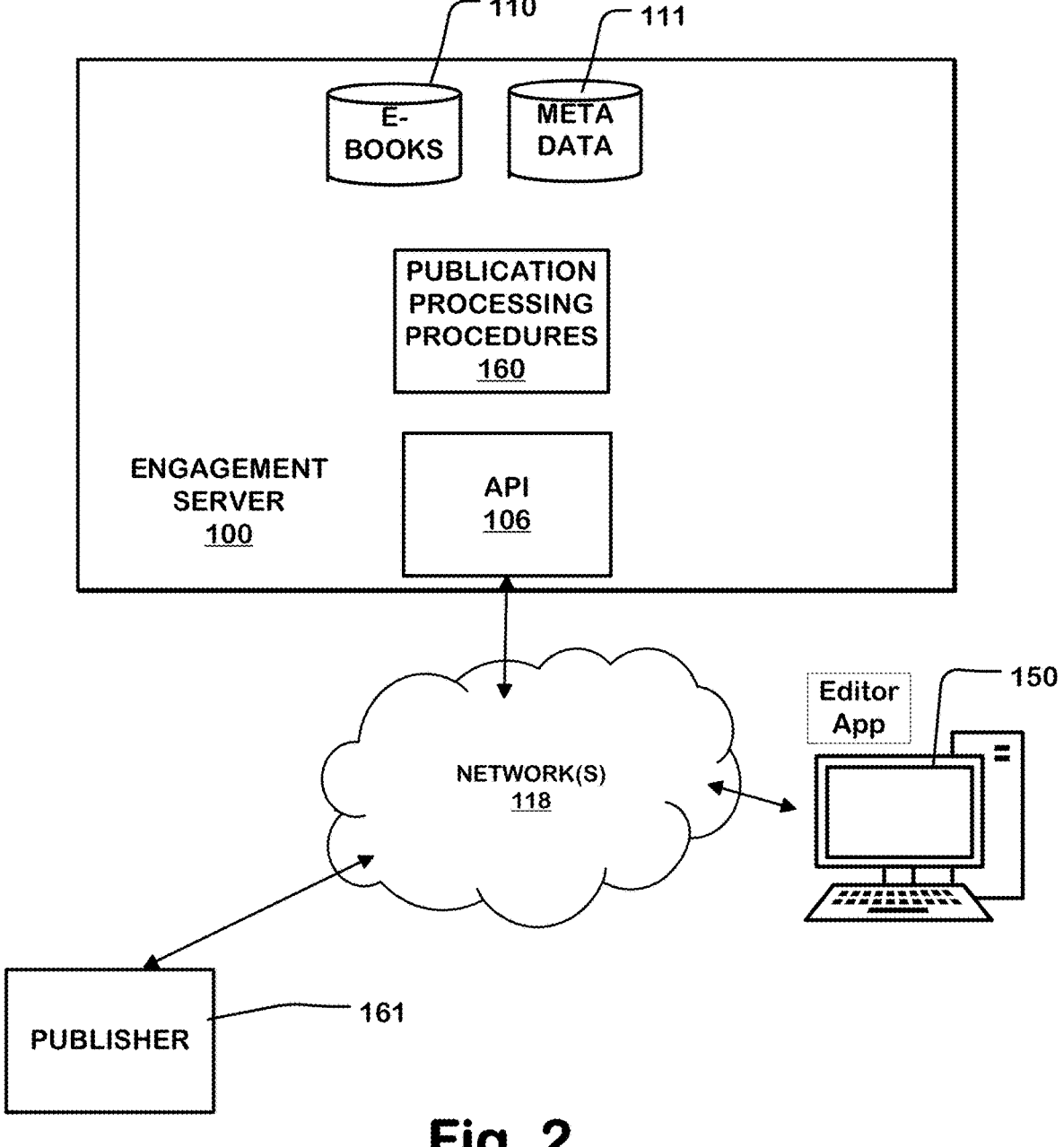
FIG. 2 is a network perspective diagram illustrating a configuration of the system for intake and processing of electronic documents, such as e-books, to provide metadata identifying engagement containers and engagement data for use in the engagement system of FIG. 1.

FIG. 2 illustrates another aspect of the system by which electronic documents are acquired and configured for utilization. In this system, a publisher 161 of electronic documents is coupled to the network 118. Engagement server 100 includes publication processing procedures 160 configured to process an electronic document to add container metadata and engagement data for the purposes of supporting the presentation of the electronic document as described herein. Also, the server 100 includes an API 106 configured for communication with an editor application which can execute on a network node 150 coupled with a network 118. The publication processing procedures 160 produce metadata associated with the content of the electronic documents stored in the data set (e-books) 110 and (metadata) 111 utilized by the server 100.

Standard metadata associated with electronic documents such as e-books is not effective for some electronic documents for defining engagement units for the purposes of the presentation system described herein. The amount of information in chapters and paragraphs varies widely and is completely under control of the authors. Thus, relying on these markers in the electronic documents for the purposes of engagement can be impractical. Thus, the electronic documents are further processed in technology described herein to identify engagement units referred to herein as spoonfuls, and tagged with metadata to define the engagement containers within the electronic document having an amount or type of content that satisfies requirements of engagement techniques applied. Addition of spoonful-based engagement container metadata to the electronic document makes computerized presentation more effective and efficient, and supports gamification of the presentation.

The spoonful generation is done in embodiments described herein on a "cleaned" version of each chapter file in the e-book, where markup associated with the e-book that may not be pertinent to the engagement system has been removed.

The procedures which can be executed at the server or other network nodes, used for defining the engagement containers can be adapted to the particular types of e-books. There are two algorithms described herein:

(A) For picture books, like the books in the Beatrix Potter collection.

A significant hallmark of these books is that they have many images, with very little text in between the images. The rules driving this algorithm are:

A-1) Each spoonful can have a maximum of 2 images

A-2) Each spoonful will start with an image, followed by the text until the next image (which will be placed in the next spoonful), OR it will start with text and end with an image.

A-3) Corollary: since the amount of text in between the images in these books is small, each block of text will not be split across multiple spoonfuls.

(B) For books containing primarily text and a few embedded images.

The spoonful generation process takes a parameter: "data-size". The default value is 1200 characters. This size has been empirically determined to effectively define an engagement unit with sufficient content for the purposes of a meaningful engagement with the reader. The size, however, typically does not match up with chapter and paragraph markup in the electronic document, and so further processing is necessary.

The rules for an example of this algorithm are:

B-1) The e-books generally have all the text enclosed within <p> (paragraph) tags at the top-level. Text within any single <p> tag will not split across spoonfuls.

B-2) The number of characters in each spoonful can be between 90% and 110% of the data-size value (e.g. 1200+/−120).

B-3) As the text inside each <p> tag is added to the current spoonful, the character count is incremented.

B-4) If the current count is <90% of data-size, check the next <p> tag.
    IF adding the text of the next <p> tag will put the count over 110% of data-size, then don't include it.
    Else, add it to the current spoonful, and continue the iterative algorithm.

In addition to the automated markup process by which the engagement containers are specified, engagement data, which is referred to herein as validation metadata, must be produced and linked with, preferably, each engagement container. A successful execution of the engagement by the reader validates that the reader has read the content of the engagement container and is ready to progress to a next engagement unit.

The server 100 provides an interface allowing editing by a person for the final tagged file—i.e. an administrator or editor console. The tagged document identifying the initial placement of markup specifying the engagement containers is provided to the editor application. The user interface is presented allowing an operator of the editor application to adjust the boundaries of the engagement containers. Also, the user interface provides for entry of questions and multiple choice answers for the purposes of the engagement tool. Also, other types of engagement can be specified, including questions with text answers, questions requiring audio response, and other types of engagements that can validate review of the content of the corresponding linked engagement container.

After addition of the engagement data links to the engagement containers, and potentially editing of the boundaries of the engagement containers, using the editor application, the electronic document is ready for utilization in the presentation system described herein.

FIGS. 20-31 herein illustrate aspects of the editor application for an embodiment of the presentation system.

Functions of the server 100, the reader application and the supervisor application can be understood with reference to the following specification of an API suitable for use as API 106 in FIG. 1, defining parameters and procedures of the system in support of presentation of the electronic document.

The following table provides the definition of data elements referred to in the specification of the API below. This information can be understood further with reference to the entity relationship diagram shown in FIG. 11.

| | |
|---|---|
| parentData | parentId, authenticatedUserUID, firstName, lastName, nickName, hasAvatar, avatarName, hasImage, imagePath, imageFileName, childCount |
| childData | childId, parentId, authenticatedUserUID, firstName, lastName, nickName, hasAvatar, avatarName, hasImage, imagePath, imageFileName, age, gradeLevel, readingLevel, spellingPerformanceLevel, comprehensionPerformanceLevel, vocabularyPerformanceLevel, favoriteMovie, favoriteBook1, favoriteBook2, favoriteBook3, favoriteGenres, pointsEarned, pointsRedeemed, pointsAvailable, crystalsCounter |
| bookData | bookId, title, subTitle, authorName, shortDesc, longDesc, edition, pubDate, addedDate, bookGenre, bookLevel, price, rating, coverImageUrl, chapterCount, spoonfulCount, wordCount, questionCount, bookContentURI |

-continued

| | |
|---|---|
| parentBookData | bookId, title, subTitle, authorName, shortDesc, longDesc, edition, pubDate, addedDate, lib_addedDate, bookLevel, price, rating, coverImageUrl, chapterCount, spoonfulCount, wordCount, questionCount, bookContentURI |
| childBookData | bookId, title, subTitle, authorName, shortDesc, longDesc, edition, pubDate, addedDate, bookLevel, price, rating, coverImageUrl, chapterCount, spoonfulCount, wordCount, questionCount, bookContentURI |
| assignmentData | dueDate, assignmentDate, readingStartDate, unit, numUnits, freqInDays, deliveryInterval, deliveryStartTime, deliveryEndTime, readTime, readPercentage, score, chapterCounter, spoonfulCounter, wordCounter, questionCounter, accuracyIndex, hasCompleted, completionDate |
| teacherData | teacherId, userId, firstName, lastName, nickName, hasAvatar, avatarName, hasImage, imageFileName |
| rewardData | rewardId, rewardName, rewardCategory, shortDesc, longDesc, imageUrl, widgetUrl, ecommLink, specialInstructions, purchasePrice |
| childRewardData | childId, rewardId, rewardStatus, requestedDate, approvedDate, claimedDate, fulfilledDate, deniedDate, pointsNeeded, pointsRedeemed |
| rewardHistoryData | rewardHistoryId, childId, rewardId, RewardStatus, requestedDate, approvedDate, claimedDate, fulfilledDate, pointsRedeemed |
| eventData | eventId, fromId, fromUserType, eventType, message, eventDate, isNotificationRequired, notificationSentDate, eventStatus, objectTypeOne, objectIdOne, objectTypeTwo, objectIdTwo, objectTypeThree, objectIdThree |
| parentRewardData | parentId, rewardId, rewardName, rewardCategory, shortDesc, longDesc, imageUrl, widgetUrl, ecommLink, specialInstructions, purchasePrice |

The following table defines reference values for certain reference elements referred to in the specification of the API provided below.

| Reference Element | Reference Values |
|---|---|
| userType | Parent, Child, Administrator, Teacher |
| objectType | Book, Reward |
| eventType | Book Assigned, Book Completed, Spoonful Arrived, Spoonful Complete, Spoonful Read, Reward Requested, Reward Approved, Reward Claimed, Reward Fulfill Started, Reward FulfillCompleted, Reward Denied |
| readingLevel | NotInitialized, Preprimer, Primer, First, Second, Third, Fourth, Fifth, Sixth, Seventh, Eighth, Ninth, Tenth, Eleventh, Twelfth |
| performanceLevel | NotInitialized, Beg, Mid, End |
| deviceType | iOS, Android |
| hasImage | true/false (or) 1/0 |
| hasAvatar | true/false (or) 1/0 |
| hasCompleted | true/false (or) 1/0 |

Elements of an example of an API, including procedures and parameters, are defined as follows, used for communication with the server by the supervisor application and with the reader application.

1. addParent (POST)
   Header {orgUID}
   Payload {userName(M), password(M), firstName(M), lastName(M)}
   Response {success, parentId, authenticatedUserUID}
2. sendEmailVerificationCode (POST)
   Header {orgUID}
   Payload {userName(M)}
   Response {success}
3. validateEmailVerificationCode (POST)
   Header {orgUID}
   Payload {userName(M), verificationCode(M)}
   Response {success}

4. updateParent (POST)
   Header {orgUID, session Token}
   Payload {parentId(M), nickName(M), hasAvatar(M), avatarName(M), hasImage(M), imageFileName (M)}
   Response {success}
5. addChildToParent (POST)
   Header {orgUID, session Token}
   Payload {parentId(M), name(M), age(M), gradeLevel (M), readingLevel(M), spellingPerformanceLevel (M), comprehensionPerformanceLevel(M), vocabularyPerformanceLevel(M), crystalsCounter(M)}
   Response {success, childId, authenticatedUserUID, verificationCode}
6. updateChild (POST)/* favoriteGenres is an array of genres id's, Ex:-[1,2,3] */
   Header {orgUID, session Token}

Payload {childId(M), name(O), age(O), gradeLevel (O), readingLevel(O), hasAvatar(O), avatarName (O), hasImage(O), imageFileName(O), spellingPerformanceLevel(O), comprehensionPerformanceLevel(O), vocabularyPerformanceLevel(O), favoriteMovie(O), favoriteBook1(O), favoriteBook2(O), favoriteBook3(O), favoriteGenres(O), crystalsCounter(O)}
Response {success}

7. loginParent (POST)
   Header {orgUID}
   Payload {userName(M), password(M)}
   Response {success, sessionToken, <parentData JSON object>}

8. loginParentByUID (POST)
   Header {orgUID}
   Payload {authenticatedUserUID (M)}
   Response {success, sessionToken, <parentData JSON object>}

9. loginChildByUID (POST)
   Header {orgUID}
   Payload {authenticatedUserUID(M)}
   Response {success, sessionToken, <childData JSON object>}

10. getChildVerificationCode (GET)
    Header {orgUID, session Token}
    Payload {childId (M)}
    Response {success, verificationCode}

11. authenticateChild VerificationCode (POST)
    Header {orgUID}
    Payload {verificationCode(M)}
    Response {success, childId, authenticatedUserUID}

12. getChildrenByParentId (GET)
    Header {orgUID, session Token}
    Payload {parentId(M)}
    Response {success, childData[<array of childData JSON objects>]}

13. addBookToParentBookShelf (POST)
    Header {orgUID, session Token}
    Payload {bookId(M), parentId(M)}
    Response {success}

14. getBookShelfByParentId (GET)
    Header {orgUID, session Token}
    Payload {parentId(M)}
    Response {success, bookData[<array of parentBookData JSON objects>]}

15. getBookShelfByParentIdNew (GET)
    Header {orgUID, session Token}
    Payload {parentId(M), pageNumber(M), numberOfRecords(M)}
    Response {success, bookCount, bookData[<array of parentBookData JSON objects>]}

16. addBookToChildBookShelf (POST)
    Header {orgUID, session Token}
    Payload {bookId(M), childId(M)}
    Response {success}

17. getBookShelfByChildId (GET)
    Header {orgUID, session Token}
    Payload {childId(M)}
    Response {success, childBookData[<array of childBookData JSON objects>,<array of assignmentData JSON objects>]}

18. getBookShelfByChildIdNew (GET)
    Header {orgUID, session Token}
    Payload {childId(M), pageNumber(M), numberOfRecords(M)}

Response {success, bookCount, childBookData[<array of childBookData JSON objects>, <array of assignmentData JSON objects>]}

19. getBookInfoByBookIdAndChildId (GET)
    Header {orgUID, session Token}
    Payload {bookId(M), childId(M)}
    Response {success, childBookData[<array of bookData JSON objects>, <array of assignmentData JSON objects>]}

20. get ValidationMetadataBybookIdAndChapterId (GET)
    Header {orgUID, session Token}
    Payload {bookId(M), chapterId(M)}
    Response {success, validationMetadata}

21. updateBookAssignmentForChild (POST)
    Header {orgUID, session Token}
    Payload {childId(M), bookId(M), dueDate(O), assignmentDate(O), readingStartDate(O), unit(O), numUnits(O), freqInDays(O), delivery Interval(O), deliveryStartTime(O), deliveryEndTime(O)}
    Response {success}

22. updateBookTrackingForChild (POST)/* if hasCompleted is true then completionDate is mandatory */
    Header {orgUID, session Token}
    Payload {childId(M), bookId(M), readTime(O), readPercentage(O), score(O), accuracyIndex, chapterCounter(O), spoonfulCounter(O), wordCounter(O), questionCounter(O), hasCompleted(O), completionDate(O)}
    Response {success}

23. pointsRedeemedByChildId (POST)
    Header {orgUID, session Token}
    Payload {childId(M), rewardId(M), pointsValue(M)}
    Response {success}

24. getChildrenByBookId (GET)
    Header {orgUID, session Token}
    Payload {bookId(M), parentId(M)}
    Response {success, childData[<array of childData JSON objects>]}

25. getRewardList (GET)
    Header {orgUID, session Token}
    Payload { }
    Response {success, rewardData[array of rewardData JSON objects]}

26. getRewardListNew (GET)
    Header {orgUID, sessionToken}
    Payload {pageNumber(M), numberOfRecords(M)}
    Response {success, rewardCount, rewardData[array of rewardData JSON objects]}

27. getRewardsByChildId (GET)
    Header {orgUID, session Token}
    Payload {childId (M)}
    Response {success, childRewardData[<array of childCurrentRewardData JSON objects>,<array of rewardData JSON objects>]}

28. getRewardCategories (GET)
    Header {orgUID, session Token}
    Payload { }
    Response {success, rewardCategoryData[array of rewardCategoryData JSON objects]}

29. getRewardsByCategoryId (GET)
    Header {orgUID, sessionToken}
    Payload {rewardCategoryId(M)}
    Response {success, rewardData[array of rewardData JSON objects]}

30. getRewardsByCategoryIdNew (GET)
 Header {orgUID, session Token}
 Payload {rewardCategoryId(M), pageNumber(M), numberOfRecords(M)}
 Response {success, rewardCount, rewardData[array of rewardData JSON objects]}
31. addRewardsToParentList (POST)/* rewardIds is an array of reward id's, Ex:-[1,2,3] */
 Header {orgUID, session Token}
 Payload {parentId(M), rewardIds(M)}
 Response {success}
32. removeRewardsFromParentList (POST)/* rewardIds is an array of reward id's, Ex:-[1,2,3] */·
 Header {orgUID, session Token}
 Payload {parentId(M), rewardIds(M)}
 Response {success}
33. addRewardToChildList (POST)
 Header {orgUID, session Token}
 Payload {childId(M), rewardId(M)}
 Response {success}
34. removeRewardsFromChildList (POST)/* rewardIds is an array of reward id's, Ex:-[1,2,3] */
 Header {orgUID, session Token}
 Payload {childId(M), rewardIds(M)}
 Response {success}
35. getRewardsByParentId (GET)
 Header {orgUID, session Token}
 Payload {parentId(M)}
 Response {success, parentRewardData[array of parentRewardData JSON objects]}
36. requestReward (POST)
 Header {orgUID, sessionToken}
 Payload {childId(M), rewardId(M), silentReplace(M)}
 Response {success}
37. approveReward (POST)
 Header {orgUID, session Token}
 Payload {childId(M), rewardId(M), pointsNeeded(M)}
 Response {success}
38. claimReward (POST)
 Header {orgUID, sessionToken}
 Payload {childId(M), rewardId(M)}
 Response {success}
39. fulfillRewardStarted (POST)
 Header {orgUID, session Token}
 Payload {childId(M), rewardId(M)}
 Response {success}
40. fulfillRewardCompleted (POST)
 Header {orgUID, session Token}
 Payload {childId(M), rewardId(M)}
 Response {success}
41. denyReward (POST)
 Header {orgUID, session Token}
 Payload {childId(M), rewardId(M)}
 Response {success}
42. getRewardHistoryByChildId (GET)
 Header {orgUID, session Token}
 Payload {childId(M)}
 Response {success, rewardHistoryData[array of rewardHistoryData JSON objects]}
43. trackSpoonfulByChild (POST)
 Header {orgUID, session Token}
 Payload {childId(M), bookId(M), chapterId(M), spoonfulId(M), questionId(M), date(M), totalAttempts(M), successfulAttempts(M), readTime(M), points Value(M), numUnitsCompleted(M)}
 Response {success}

44. getDeliveryDataForChild (GET)
 Header {orgUID, session Token}
 Payload {childId(M), bookId(M), date(M)}
 Response {success, numUnitsGoal, numUnitsCompleted}
45. getTrackingDataByChildAndBook (GET)
 Header {orgUID, session Token}
 Payload {childId(M), bookId(M)}
 Response {success, totalAttempts, successfulAttempts, readTime, points}
46. updateUserDevice Token (POST)
 Header {orgUID, session Token}
 Payload {userType(M), id(M), deviceType(M), deviceId(M), device Token(M)}
 Response {success}
47. createEvent (POST)
 Header {orgUID, session Token}
 Payload {fromId(M), fromUserType(M), toId:(M), toUserType(M), eventType(M), message(M), isNotificationRequired(M), objectTypeOne(O), objectIdOne(O), objectTypeTwo(O), objectIdTwo(O), objectTypeThree(O), objectIdThree(O)}
 Response {success}
48. getEvents (GET)
 Header {orgUID, session Token}
 Payload {id(M), userType(M)}
 Response {success, eventData[array of eventData JSON objects]}
49. addRegisteredDevice (POST)
 Header {orgUID, session Token}
 Payload {parentId(M), childId(O), deviceName(M) deviceId(M)}
 Response {success}

Figure 11:
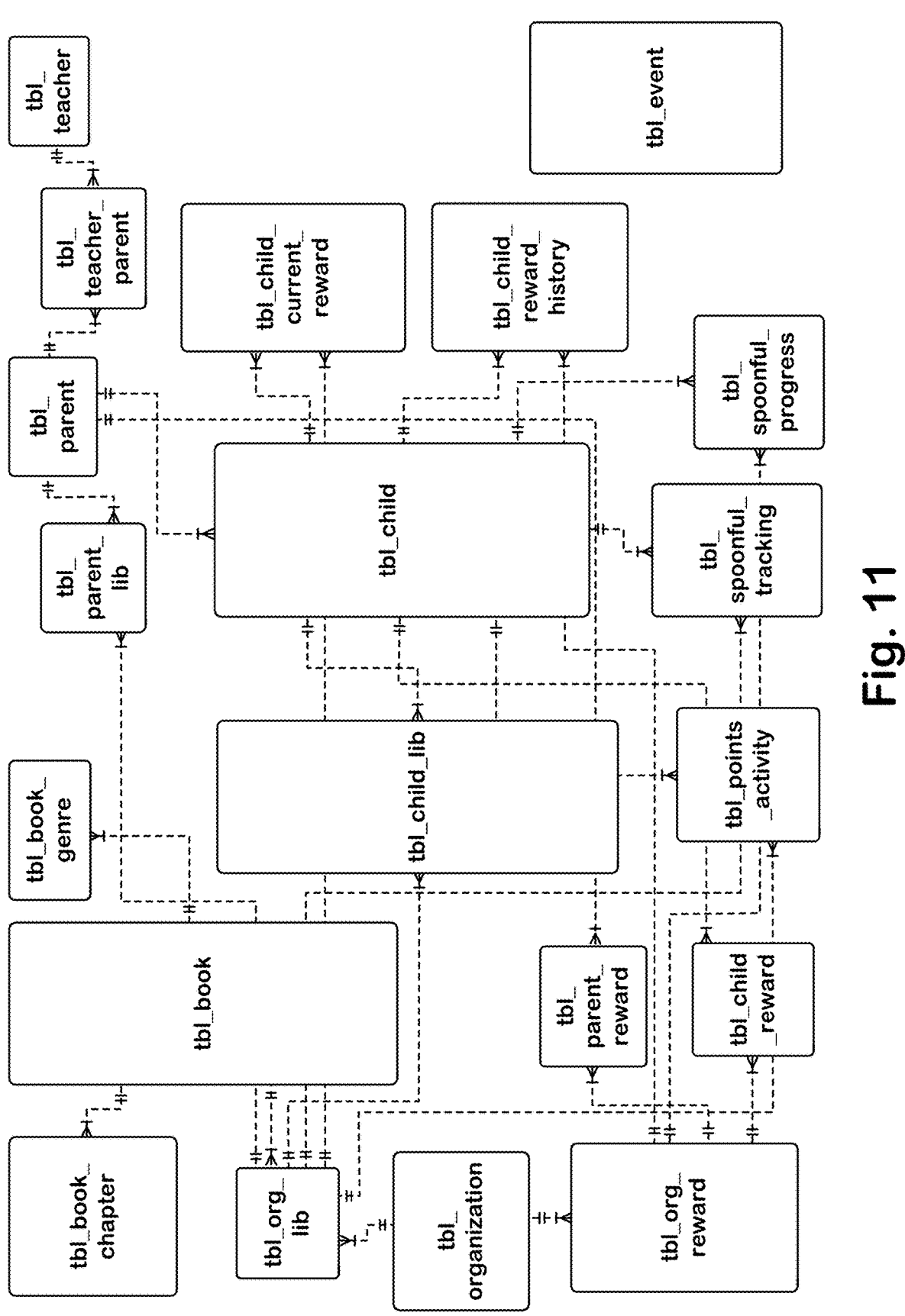
FIG. 11 constitutes an entity relationship diagram for data structures maintained in support of the procedure for presentation of electronic documents as described herein.

FIG. 11 provides a global view of the data model used for establishing, running a game, and maintaining states for the game.

The data model in general includes the parent (supervisor) and child (reader) relationship (1:many) along with the book-assignment data structures for each child (reader) (1:many).

The book-assignment structure keeps track of the criteria selected by the parent when assigning a book to the child: due-date or none, what measure is used to deliver the material (# of chapters or # of spoonfuls per day), the time restriction for the reading (if any), etc.

The data structures for the progress/tracking of each child for each e-book they are reading can be based on 2 distinct measures:

(a) the granularity, being a spoonful-ID, tracking their progress against the goal of how much they should have read on a particular date—based on the assignment data.

(b) for the Validation Quiz associated with each Spoonful, how many Answers the child has attempted for each Spoonful, and in aggregate across the entire Book, and how many correct Answers they have selected across the set of Spoonfuls they have read and answered.

Maintaining the state of where the reader is in the "reading game" for each electronic document is accomplished using a combination of the above data structures.

FIG. 3 is a simplified illustration of reader procedures executed by a reader application on a smart phone or tablet for example, which may be utilized by a child to traverse the engagement containers of an electronic document, and perform the engagement exercises defined and linked to the engagement container. These procedures communicate with the server using an API, for example as described above, to access, process and update the data structures that support a game based on electronic documents as assigned by the supervisor application.

In this example, the reader procedures include the API interface 200 that enables receiving assignments and reporting status information about assigned electronic documents. The reader procedures include storage 201 in which e-books or other electronic documents are downloaded from the server and held for traversal by the game. The reader procedures include e-book engagement container pacing logic supporting user interface operations for traversing the electronic documents according to parameters of the assignment. Also, logic 203 for tracking and reporting status of the traversal of the electronic documents is provided. The reader application includes tools 205 for displaying an engagement container for review by an individual, and an engagement tool 206 which presents engagement game interface links to engagement containers in the electronic document. Furthermore, the reader application includes login logic 204, which can enable a reader to log into the system without providing identifying information in a manner that is supported by the supervisor application.

FIG. 4 is a simplified illustration of supervisor procedures executed by a supervisor application, which can also be on a smart phone or tablet for example, and which may be utilized by a parent or teacher to assign electronic documents to readers, specify parameters of a game including engagement parameters for the engagement process for individual readers, track progress of readers under its supervision, and execute electronic commerce transactions to obtain e-books or other electronic documents and to obtain rewards earned by readers under its supervision according to game rules.

In this example, the supervisor procedures include an API interface 210 to communicate with the server using an API, for example as described above, to access, process and update data structures that support the game based on electronic documents assigned to readers under its supervision. Modules of the supervisor application include logic to maintain information about assigned bookshelves 211, which comprise electronic documents assigned to readers under supervision. The supervisor application includes an account management module 212 for readers under supervision to use for setting up accounts for reader applications, linking to sources of e-books or other electronic documents, assigning performance parameters to individual readers and electronic documents, and other management procedures. Also, status tracker and reporter module 213 is included, by which the supervisor application is able to retrieve status and report status to the server, in a way that allows tracking of performance of readers under its supervision. The supervisor application includes a module 216 linking to the server or other resources for the purposes of supporting electronic commerce to obtain electronic documents and rewards in support of the gaming system. The supervisor application includes tools 215 for display of status, and assignment information for readers under supervision. Also, the supervisor procedures include a login module 214, which supports authentication and authorization procedures necessary for linking to reader applications, and executing electronic commerce transactions.

Figure 5:
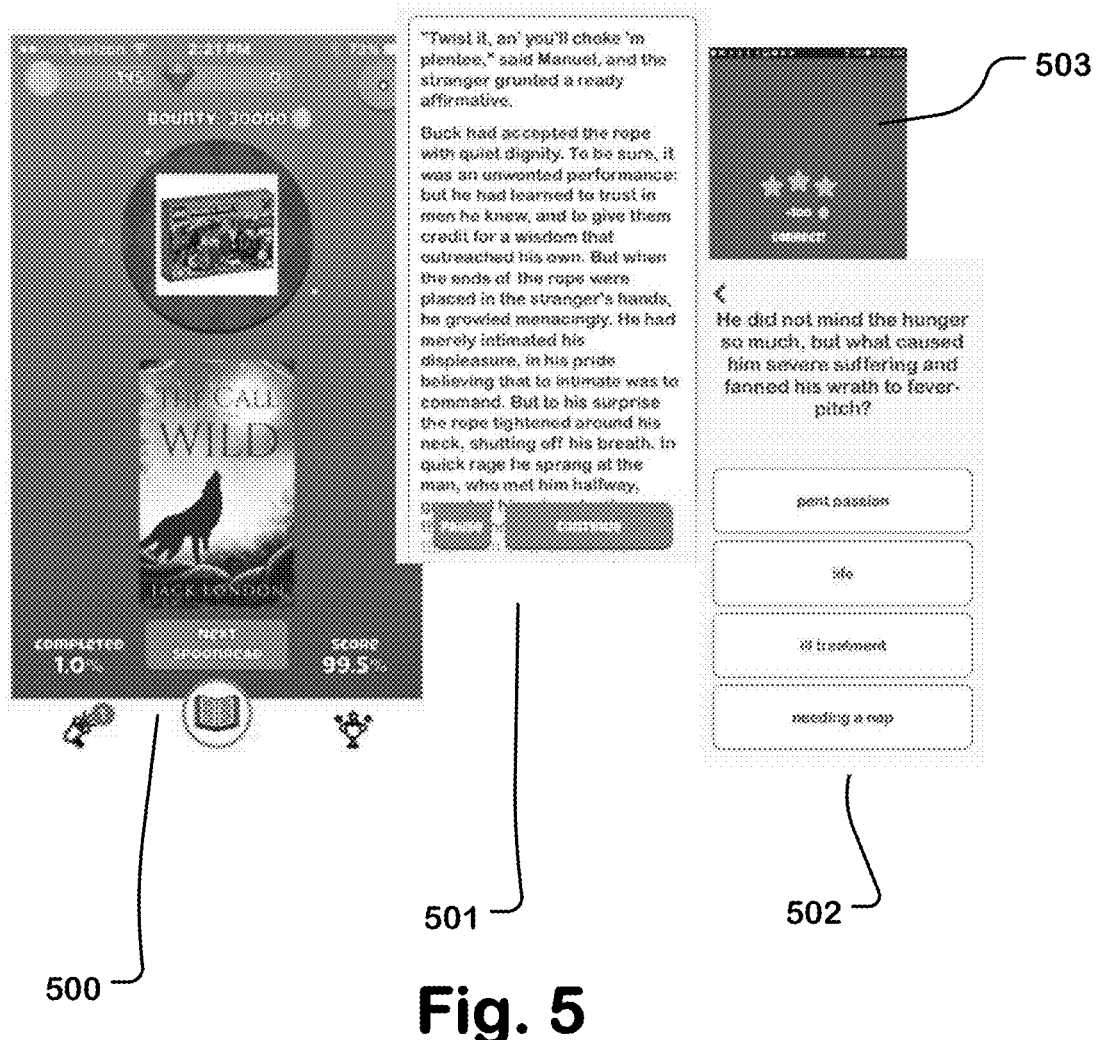
FIG. 5 illustrates a set of user interface screens utilized by the reader application in the procedure for presentation of electronic documents as an example for use in a system as described herein.

FIG. 5 illustrates four user interface screens supported by a reader application, used for traversing electronic documents. Screen 500 shows an image presented when a reader selects an e-book which has been assigned to the reader. The screen shows a cover image of the e-book selected, a picture of a reward which has been presented to the reader which can be delivered upon achieving goals in the game defined by the supervisor, and statistics concerning progress and performance in the engagement procedures. In this example, the statistics include a percentage (e.g. 1%) of the e-book which has been completed, by reviewing the contents of an engagement container and executing the engagement exercise defined and linked to the engagement container. Also, statistics include a score which can indicate a percentage of correct answers provided during the engagement exercises, or other information about progress and performance of the game. Statistics shown in this example also include a number of points earned (145) which can be accumulated towards achieving the reward goal (bounty 30,000) associated with the illustrated reward. In addition, the statistics include a number of gems (zero in this example) which have been earned by the reader, where gems can correspond to additional levels of game interaction beyond the engagement with individual engagement containers for example. These gems can be utilized by the system to define various aspects of gameplay, or to enable different categories of rewards for the readers.

Screen 501 shows display of all or part of a "spoonful," which is the content defined by the engagement container being reviewed at this stage of traversing the engagement containers. Widgets on the screen 501 include a pause widget which a reader can use to indicate that the content is not currently being reviewed. Also, the widgets on the screen 501 include a continue widget, which can be interpreted as an engagement signal by the reader application to enable execution of the engagement exercise. After receiving the engagement signal, the reader application can display screen 502 based on the engagement data linked to the current engagement container. In this example, the engagement data defines a question and multiple choices for an answer to the question. The reader application accepts input indicating a choice of answers from the reader to provide data responsive to the engagement. This data is evaluated for correctness and a score is assigned and points awarded for the current engagement container based on the received data and parameters defined in the engagement metadata. Screen 503 is displayed upon completion of the interaction showing points awarded for the current engagement container. After screen 503, a next engagement container is displayed as the reader continues to traverse the engagement containers of the electronic document.

Figure 6:
FIG. 6 illustrates a set of user interface screens utilized by the supervisor application in the procedure for presentation of an electronic document as an example for use in a system as described herein.

FIG. 6 illustrates seven user interface screens supported by a supervisor application in one example. Interface screen 520 displays a "bookshelf" assigned to a specific reader comprising a set of electronic documents identified by cover images, titles and author names for example. Interface screen 521 illustrates avatars of readers under supervision, which in this example are characterized as children. The children are identified by pseudonyms and avatars in this example, avoiding use of personal identifying information in the exchange with the server and other aspects of the system. Interface screen 522 illustrates an ad reward screen, whereby a supervisor can select toys or other products to be identified as a reward to be earned by readers under its supervision.

Interface screen 523 is used to support assigning electronic documents to a child under supervision. In the screen, an individual electronic document is identified with parameters including information about the length of the book, such as word count, reading level associated with the book, and number of questions or other engagement units required for completion of the electronic document, according to the game. Also, an avatar corresponding to the child to which the book is to be assigned is illustrated.

Interface screen 524 shows a screen by which a supervisor application can traverse content of the electronic document, including images.

Interface screen 525 shows a screen generated by monitoring the status of a child under supervision. In this screen, the books assigned, the scores achieved and points awarded to the reader, the amount of time spent reading the document, and the percent completion indicating progress within the document are displayed for the supervisor application. Likewise, interface screen 526 illustrates further information about the child under supervision, indicating the number of e-books being traversed, the number completed, the amount of time spent reading the books, the average score, the points (coins) earned by the child associated with a particular game instance, and a lifetime count of the points earned.

Figure 7A:
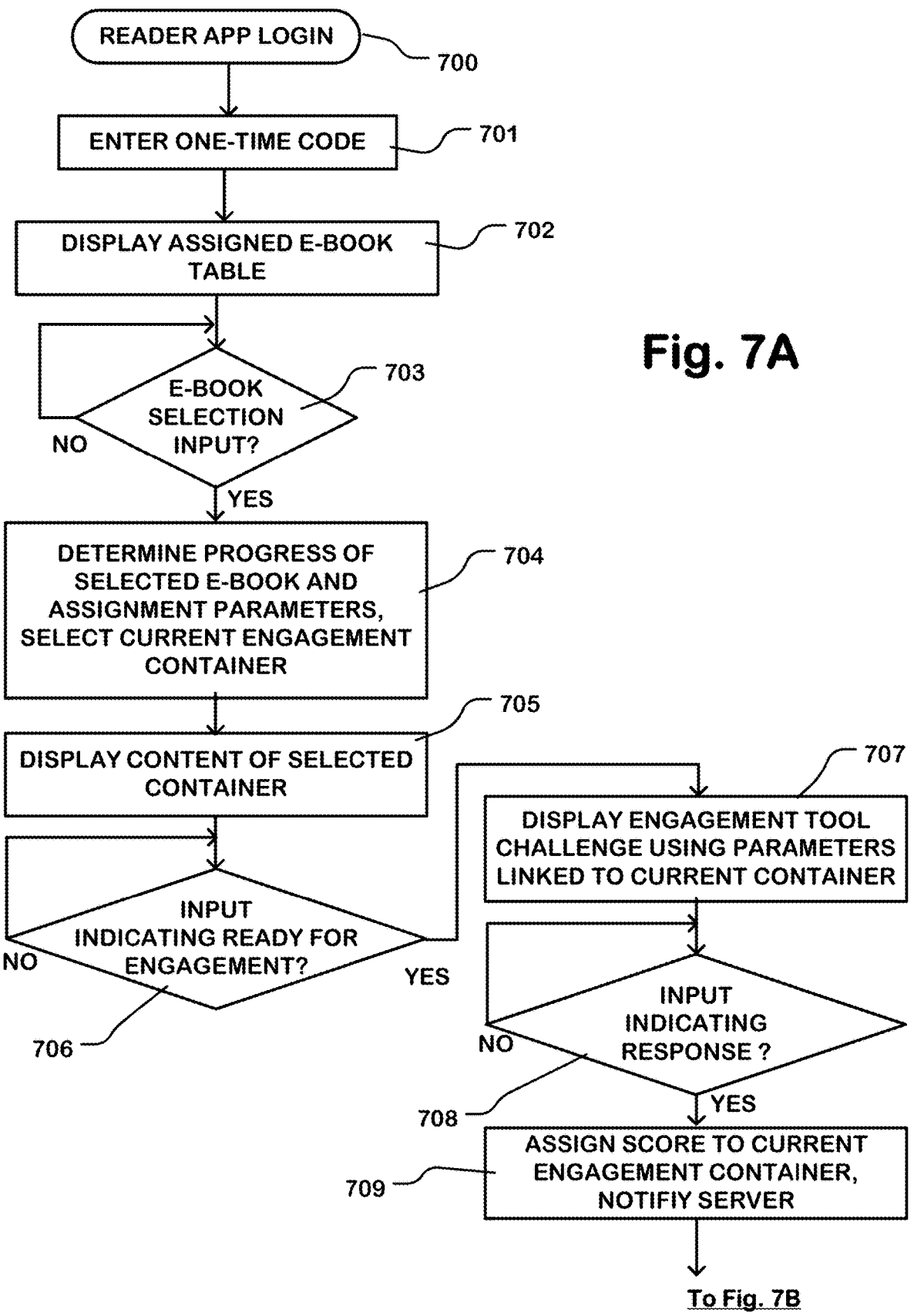
FIG. 7A is a flowchart of parts of a procedure executed by a reader application as described herein for traversing an electronic document.
Figure 7B:
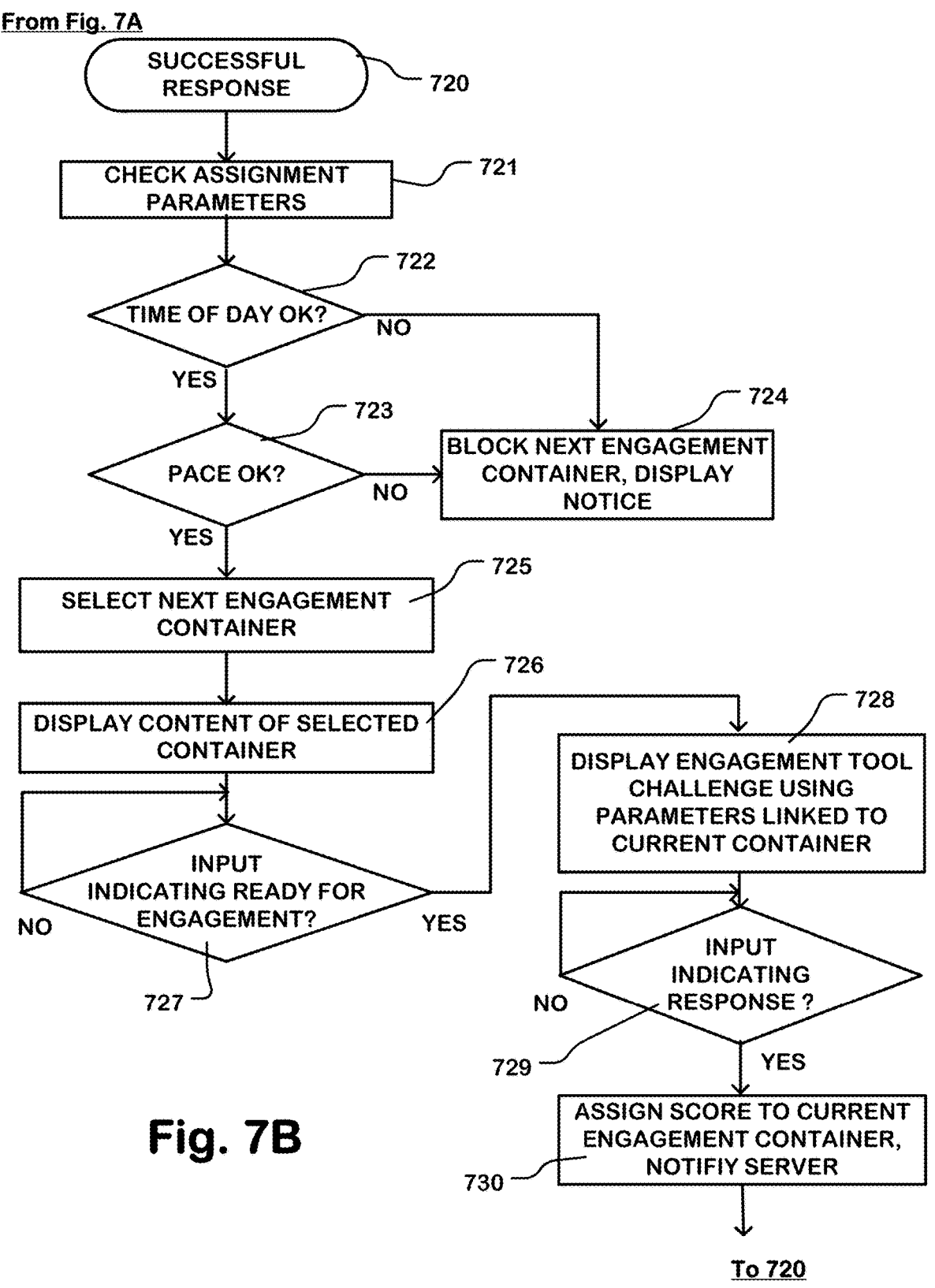
FIG. 7B is a flowchart of parts of a procedure executed by a reader application as described herein for traversing an electronic document.

FIGS. 7A and 7B are simplified flowcharts of a procedure for traversing an electronic document executed by a reader application for example, with the support of the server and the supervisor application. In this example, the application starts with a reader application login (700). Upon opening the app, if it is being executed on a platform different than the corresponding supervisor application, then a one time code is entered (701) at the reader platform to securely link the reader application to the server while preserving anonymity of the reader relative to the server. This one time code is generated and delivered under control of the supervisor application, and can have a limited time in which it is valid. If the reader application is being executed on the same platform as the supervisor application, then the applications can communicate directly to add the one time code to the reader application, and enable the reader application.

After successful linking to the server, the reader application can display a table of assigned e-books (702). The reader application can then wait for selection of an e-book (703). Upon selection, the reader application can retrieve information about the selected e-book from the server, including the content of the book, metadata defining engagement containers and engagement data, and the status of the traversal of the e-book by the reader, and proceed to select a current engagement container based on the retrieved status (704). Upon selection of the current engagement container based on parameters retrieved from the server, the spoonful defined by the current engagement container can be displayed (705). The reader application can then wait for an engagement signal indicating that the reader is ready for the engagement exercise after reviewing the spoonful (706). After accepting the engagement signal, the engagement tool on the user interface is enabled and displayed (707), presenting prompts for the engagement based on parameters defined in the engagement data linked to the current engagement container. In this example, engagement data can define questions and answers that are derived from content in the spoonful. The reader application then waits for input indicating a response to the engagement exercise (708). After accepting the response, the performance of the exercise is evaluated, points and a score are assigned, and the server is notified of progress in the electronic document (709). The procedure then proceeds to FIG. 7B to process a successful response.

In FIG. 7B, processing of a successful response is illustrated (720). After a successful response, the reader application processes assignment data to determine whether to proceed with a next engagement container or take other action. Thus, in this example, the reader application checks assignment parameters (721). The assignment parameters conclude time of day interval (e.g. between 1 PM and 5 PM), during which the supervisor has limited use of the corresponding e-book (722). If the time of day parameter is violated, then the next engagement container is blocked and the reader application can display a notice on its local display (724). If the time of day parameter is okay, then the reader application checks pacing parameters (723). Pacing parameters can identify a number of chapters or paragraphs for example to be reviewed per day according to the assignment. If the next engagement container violates the pacing parameters, then the next engagement container is blocked and the reader application can display a notice on its local display (724). If the pacing parameters are not violated by the next engagement container, then the next engagement container is selected (725). The contents of the next engagement container are displayed on the local display controlled by the reader application (726). The reader application can then wait for an engagement signal indicating that the reader is ready for the engagement exercise after reviewing the spoonful (727). After accepting the engagement signal, the engagement tool on the user interface is enabled and displayed (728), presenting prompts for the engagement based on parameters defined in the engagement data linked to the current engagement container. In this example, engagement data can define questions and answers that are derived from content in the spoonful. The reader application then waits for input indicating a response to the engagement exercise (729). After accepting the response, the performance of the exercise is evaluated, points and a score are assigned, and the server is notified of progress in the electronic document (730). The procedure then proceeds back to block 720, to process a successful response.

Figure 8A:
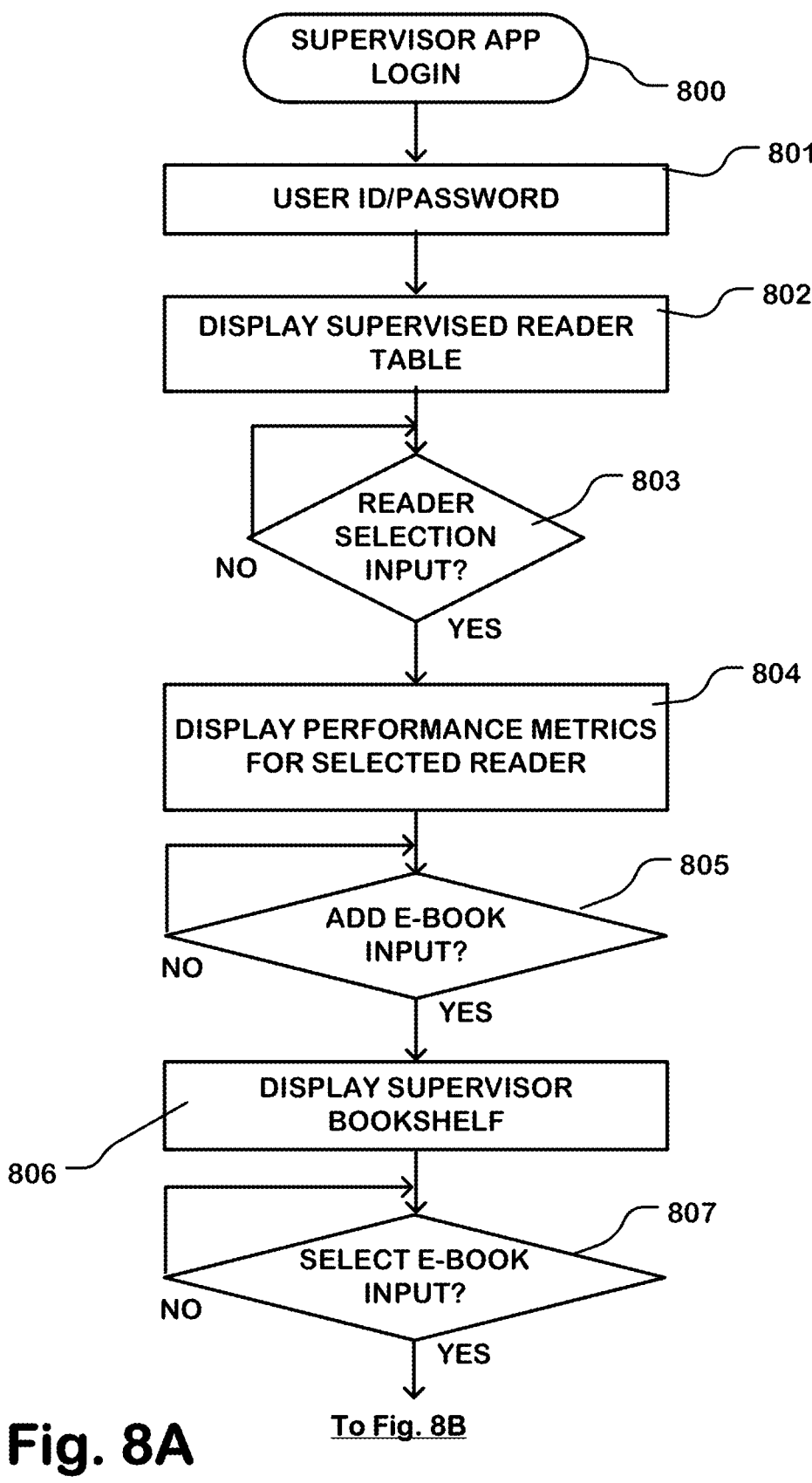
FIG. 8A is a flowchart of parts of a procedure executed by a supervisor application as described herein, for assigning electronic documents to readers under its supervision.
Figure 8B:
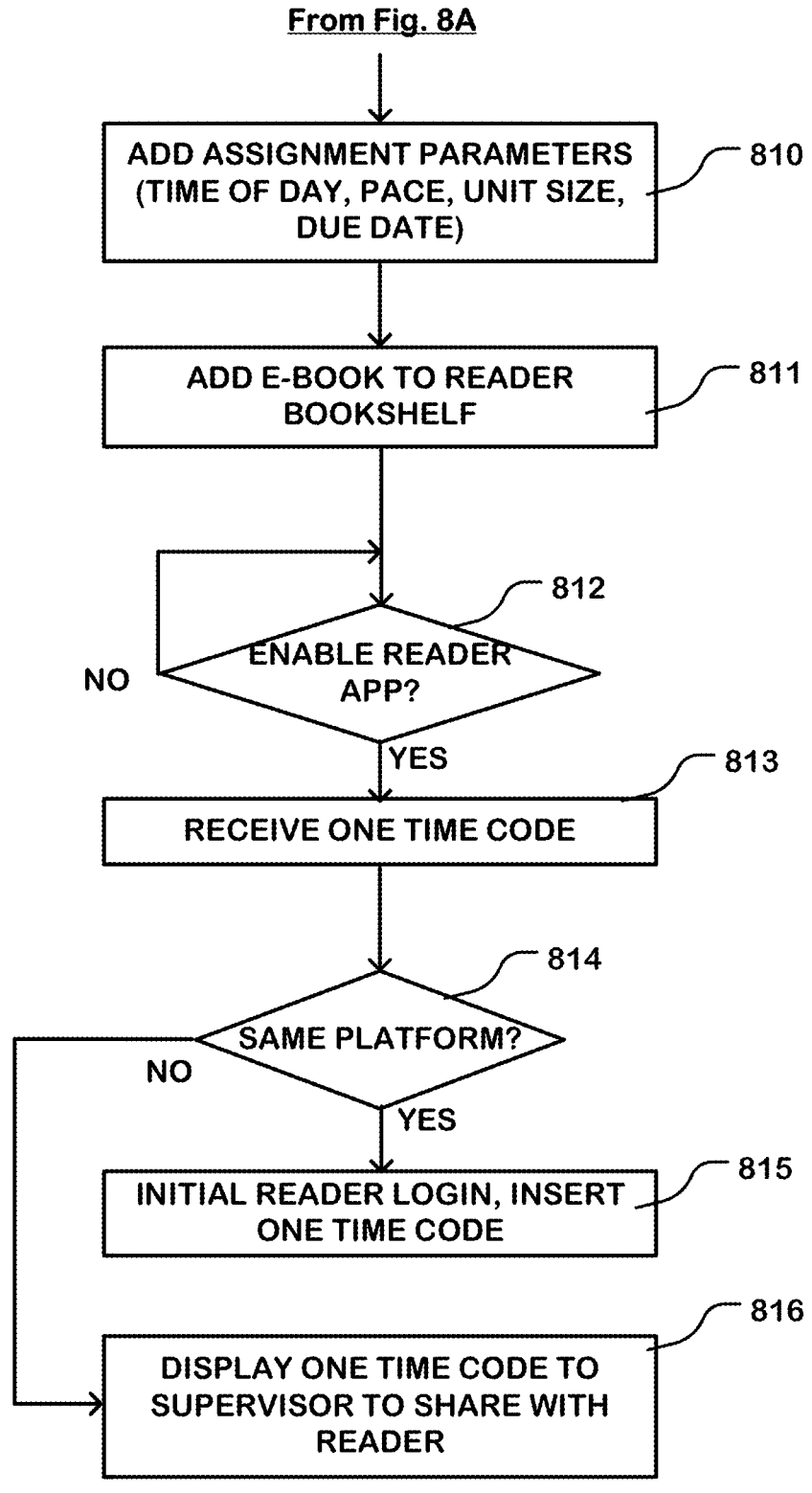
FIG. 8B is a flowchart of other parts of a procedure executed by a supervisor application as described herein, for assigning electronic documents to readers under its supervision.

FIGS. 8A and 8B are a simplified flowchart of a procedure executed by a supervisor application, for example. In this example, a supervisor application login is executed (800). This procedure can require entry of a user ID and password (801). Upon successful login, a table of supervised readers is displayed (802). The supervisor application can then wait for input selecting an individual reader (803). Upon accepting the input identifying individual reader, the supervisor application can display performance metrics associated with the reader (804). The supervisor application can wait for further input, such as input to initiate adding an e-book to the bookshelf of an individual reader (805). In response to a signal indicating that the supervisor application has initiated adding an e-book, the supervisor application can retrieve and display the contents of a bookshelf or list of the electronic documents available to the supervisor application for assignment to readers under its supervision (806). The supervisor application can wait for further input, indicating selection of a particular electronic document (807). Upon selection of a particular electronic document, the procedure continues as shown in FIG. 8B.

As illustrated in FIG. 8B, with the assignment of an e-book to a specific reader, performance parameters can be assigned to the individual reader, and the individual e-book, including for example time of day parameters, pace parameters, unit parameters to a be applied in the pacing (chapter, paragraph, spoonful) and due date parameters (810). Upon addition of e-book, the supervisor application can notify the server of the addition of the e-book to the reader application bookshelf along with the assignment parameters (811). The supervisor application can then wait for an input indicating that the supervisor wishes to enable a reader application (812). Upon receipt of the signal indicating a wish to enable a reader application, the server generates a one time code and delivers it to the supervisor application. Upon receipt of the one time code from the server (813), the supervisor application determines whether the reader application to be enabled is to be executed on the same platform (e.g. the same mobile phone) as the supervisor application, or is to be executed on a different platform (814). If the reader application is to be executed on the same platform, the one time code can be automatically entered into the reader application login procedure by the supervisor application, and the platform can be given to the reader (815). If the reader application is to be executed on a different platform, then the one time code displayed by the supervisor application so that it can be communicated to the reader for use (816). The one time code can have a time limit during which it can be utilized.

FIG. 9 shows a portion of an e-book expressed in XML markup language with added metadata defining engagement containers (some of the text characters have been removed to make space on the sheet). In this example, the engagement container metadata is embedded within the electronic document.

Markup corresponding to the embedded metadata includes <SpoonreadBody> and </SpoonreadBody>, which identifies boundaries of the electronic document which has embedded metadata as described herein. Metadata associated with the electronic document, as delivered, including metadata defining the beginning of chapters is maintained. For a chapter in this example, a plurality of engagement containers is defined. In the illustrated portion, metadata defining the engagement containers includes <Spoonful id="1"> and </Spoonful>; <Spoonful id="2"> and </Spoonful> and <Spoonful id="3"> and </Spoonful>; <Spoonful id="4"> and so on.

In the data structures of FIG. 11, this content like that shown in FIG. 9 is carried in the table "tbl_book_chapter" as the data element "chapter_content".

FIG. 10 illustrates a portion of the engagement data and metadata (validation metadata) that is linked to the engagement container shown in the excerpt of the electronic document shown in FIG. 9. Engagement data and metadata is expressed using XML in this example.

This data structure defines engagement data using markup defining a validation container <Validation> and </Validation> for each chapter in the book, and each spoonful within the chapter. Engagement data includes in this example questions associated with each spoonful, where the engagement data is linked to the corresponding engagement containers in the electronic document using the markup of the form <Spoonful id="1"> and </Spoonful>. Engagement units in the engagement data are identified in this example by markup of the form <Question id="1" type= "MultipleChoice" answer="3"> and </Question>. Questions within the engagement units are identified by the markup <q> and </q>. Answers presented in multiple-choice form in this example are identified by the markup <a> and </a>.

In the data structures of FIGS. 11, the engagement data like that shown in FIG. 10 is carried in the table "tbl_book_chapter" as the data element "validation_metadata".

The diagram shown in FIG. 11 illustrates one implementation of data structures maintained by a server application in support of the presentation system described herein. According to this organization of the data structures, each electronic document utilized in the system is identified by a book table tbl_book. Likewise, each reader and each supervisor having an account in the system is identified by user table (not shown). User types include a reader identified by a child table tbl_child, and a supervisor identified by a parent table tbl_parent. The electronic documents in this example comprise one or more chapters represented by respective chapter tables tbl_chapter linked to their corresponding book table tbl_book. Contents of the table tbl_chapter are illustrated for example with respect to FIG. 9 as discussed above. In this data structure, the individual electronic documents represented by a corresponding table tbl_book can also be linked to information about the electronic document in one or more genre tables table tbl_book_genre.

In this data structure, an organization entity is identified by a table tbl_organization. Representative organizations can include schools, publishers, nonprofit organizations and other groups that may want to participate in the gamification of electronic documents as described herein. One organization may be for example a public organization. Electronic documents represented by a table tbl_book can be linked to one or more table tbl_org_lib. Organizations identified by the table tbl_organization are linked to electronic documents via the respective table tbl_org_lib of the table tbl_book that identifies the electronic document.

Electronic documents that have been assigned to a particular reader identified by a child library table tbl_child_lib which is linked in this example to its corresponding organization via the table tbl_org_lib table. Likewise, the electronic documents that have been assigned by a supervisor identified by a supervisor library table tbl_parent_lib, which is linked in this example to its corresponding organization via the table tbl_org_lib.

Supervisor accounts are maintained in this structure using a parent table tbl_parent which is linked to one or more child tables tbl_child. In this example, authorization to act as a supervisor can be shared with a teacher or tutor utilizing a teacher-parent table tbl_teacher_parent, which is in turn links to a teacher or tutor account using a tbl_teacher table.

The data structure illustrated in FIG. 11 includes an event table tbl_event utilized to hold notifications and other events that are used by the supervisor application, the server application and the reader application which is necessary to execute their respective functions.

Progress and status of individual readers in corresponding electronic documents is tracked using a spoonful tracking table tbl_spoonful_tracking, which is linked to the child table tbl_child that is in turn linked to the corresponding tbl_child_lib which is in turn linked to the corresponding tbl_org_lib. The progress and status of individual readers is tracked also in a points activity table tbl_points_activity, which in turn links to the tbl_org_lib for connection to individual books. Also, the tbl_spoonful_tracking is linked to the tbl_org_lib that is in turn linked to the corresponding tbl_book. In addition, progress and status of individual readers in corresponding electronic documents is maintained in a spoonful progress table tbl_spoonful_progress.

The data structures maintained by the server can also include the structures used for identifying and assigning rewards for progress in the review of the electronic documents. In this example, one or more organization reward tables tbl_org_reward is linked to the organization table tbl_organization. The individual tbl_org_reward is linked to one or more child reward tables tbl_child_reward and one or more parent reward tables tbl_parent_reward. Each child table tbl_child can be linked to one or more tbl_child_reward. Likewise, each parent table tbl_parent can be linked to one or more tbl_parent_reward. The status and progress of the individual children, represented by the tbl_spoonful_progress in this example is also linked to the tbl_org_reward. Rewards that are currently assigned to a specific child are indicated by the child current reward table tbl_child_current_reward, one or more of which is linked to each tbl_child, and one or more of which is linked to each tbl_org_lib. The reward history for individual readers can be maintained in a tbl_child_reward_history table, one or more of which is linked to the tbl_org_reward table, and one or more of which is linked to each reader via the tbl_child.

In this manner, an individual child can be tracked using the spoonful progress table to determine when qualification for a particular reward has been satisfied.

Each parent can have supervisor status for multiple readers which can utilize authorized reader applications under supervision, each represented by the data structure tbl_child. The data structure tbl_child is associated with a bookshelf including one or more entries in a library of electronic documents, each represented by the table tbl_child_lib. The electronic documents included in the child bookshelf are represented by the table tbl_book. Contents of the book in this embodiment are carried in the data structure tbl_book_chapter.

Books available for assignment can be classified by a source organization, which can have control over a variety of parameters associated with the game as indicated by a number of data structures shown. The number of data structures is used to track progress in the child library, including the tables tbl_points_activity, tbl_spoonful_tracking, tbl_spoonful_progress. Reward status is also tracked in the data structures using tbl_child_current_reward, tbl_child_reward_history, tbl_parent_reward, tbl_child_reward, and so on.

The excerpts of the API set forth above are utilized for communication between the supervisor application and the server for the purposes of utilization of these data structures. Also, excerpts of the API set forth above are utilized for communication between the reader application and the server for the purposes of utilization of these data structures.

A server application running in communication with corresponding supervisor applications and reader applications executes procedures for maintaining access to a library of electronic documents using, for example, a data structure like that shown in FIG. 11. The server application can include procedures maintaining access to engagement data for electronic documents in the library, engagement data linked to the engagement containers in electronic documents in the library, and engagement data comprising parameters of an engagement based on the segments of content in the linked engagement containers. The server application can include procedures for maintaining supervisor account records, the supervisor account records identifying a set of reader accounts under supervision. The server application can include procedures for maintaining reader account records, the reader account records storing identifiers of electronic documents assigned to reader accounts, and indications of progress in the assigned electronic documents utilizing the data structures illustrated in FIG. 11.

FIG. 12 illustrates a representative organization for the tbl_book which can be utilized in the configuration of FIG. 11. FIG. 13 illustrates a representative organization for the tbl_book_chapter, linked to a tbl_book by a book_id parameter. Also, as mentioned above, the elements chapter_content in this example carries the content of a chapter of the electronic document such as that shown in FIG. 9. The element validation_metadata carries the engagement data and metadata such as that shown in FIG. 10. Other elements shown have descriptive names. FIG. 14 illustrates a representative organization for the table tbl_child_current_reward, linked to an individual child by the child_id element. FIG. 15 illustrates a representative organization for the table tbl_child, which includes a child_id element and a parent_id element. FIG. 16 illustrates a representative organization for the table tbl_child_lib, which includes a child_id element, a child_lib_id element and an org_lib_id element. This table also includes assignment parameters including time of day parameters, start time parameters, completion date parameters, as well as information related to progress of the individual child through specific electronic documents.

FIG. 17 illustrates a representative organization for the table tbl_spoonful_tracking. The data elements in this table are descriptive of their function.

FIG. 18 illustrates a representative organization for the table tbl_spoonful_progress.

Of course, data structures of this type can be organized in many ways. FIG. 11 is provided for the purposes of illustration of one approach.

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a Big-Table™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™, Truviso™, Amazon Elasticsearch Service™, Amazon Web Services™ (AWS), IBM Info-Sphere™, Borealis™, and Yahoo! S4™.

Figure 19:
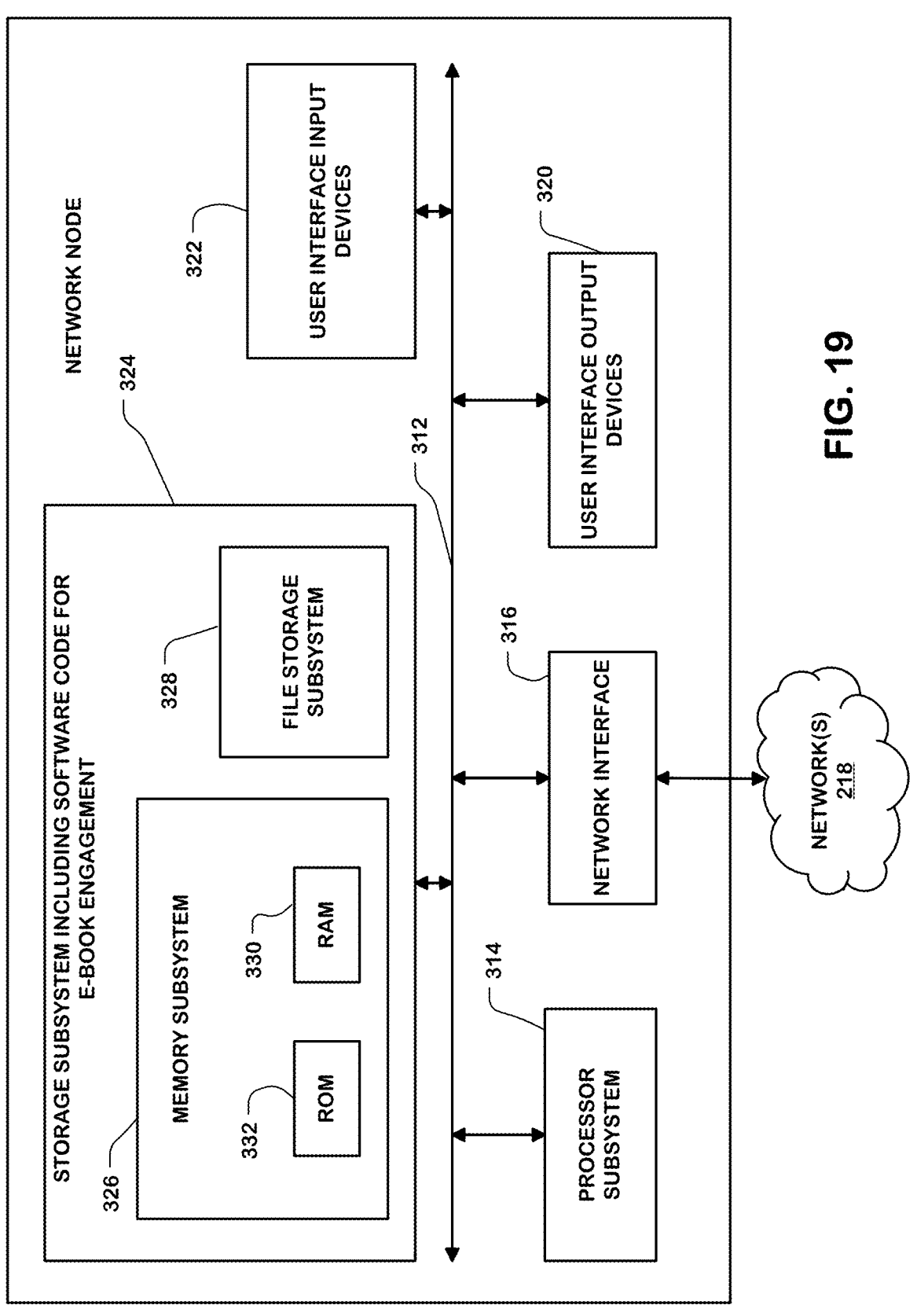
FIG. 19 is a simplified diagram of a hardware platform which is configured for execution of the server or other apps involved in the e-book engagement system described herein.
Figure 21:
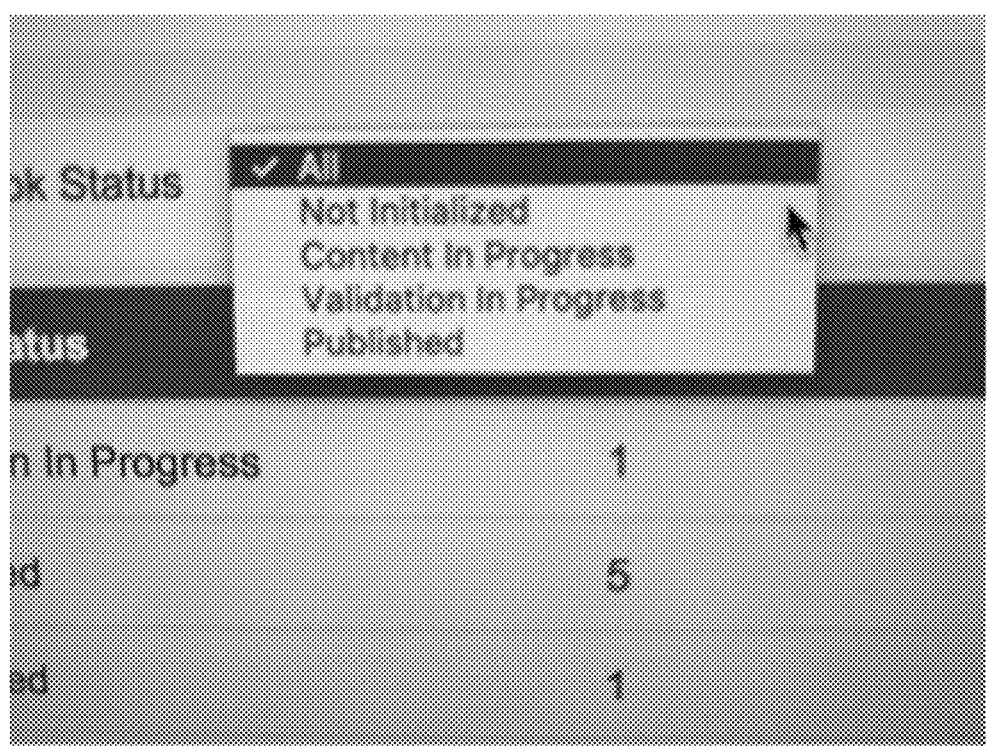
Figure 22:
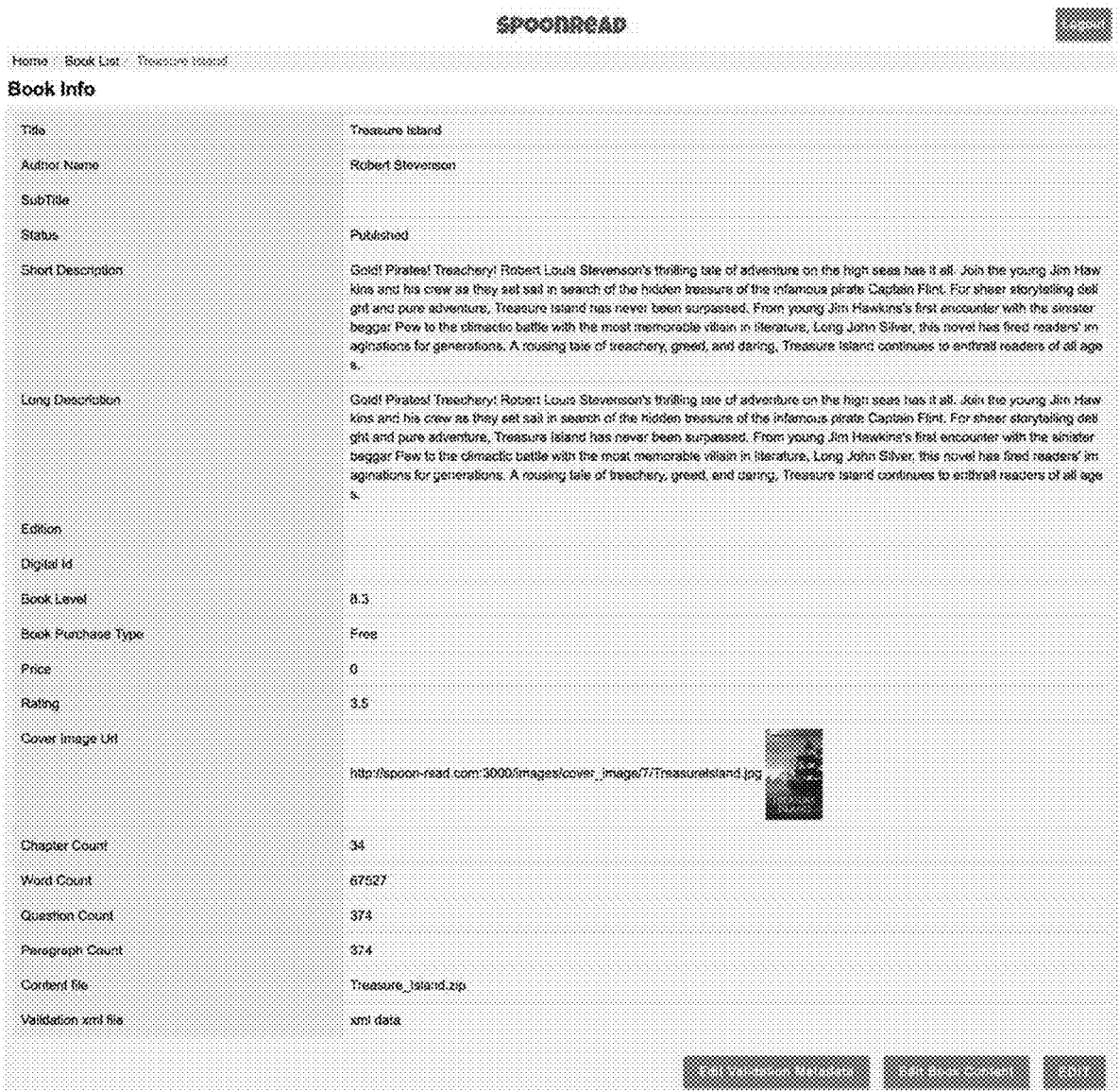
Figure 25:
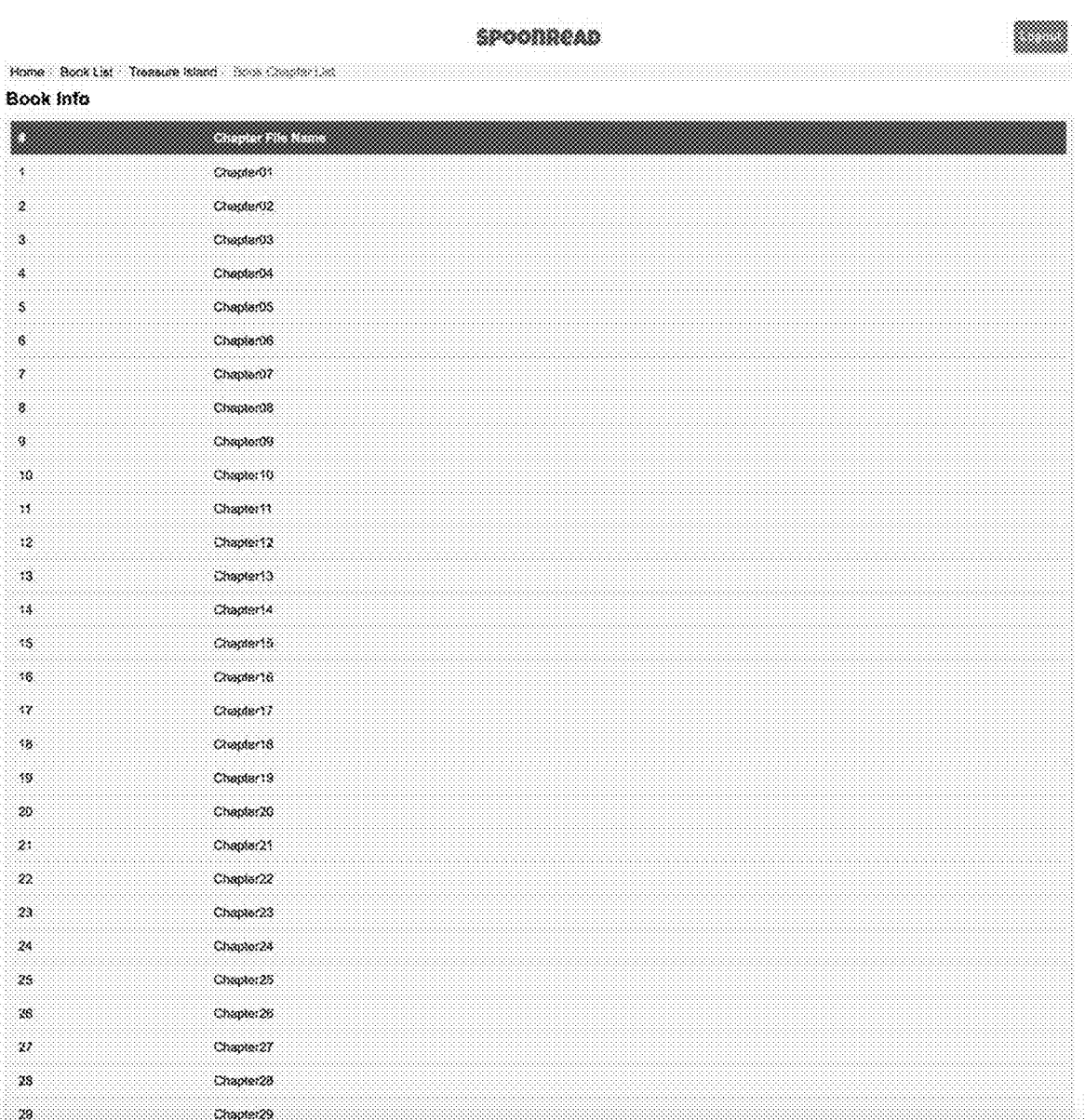
Figure 26:
Figure 27:

FIG. 19 is a simplified block diagram of a network node that can be used to implement the server side, supervisor side and reader side applications or other components of the electronic document engagement system described herein. The network node typically includes an operating system executed by a processor subsystem 314 which communicates with a number of peripheral devices via bus subsystem 312. These peripheral devices may include a storage subsystem 324, comprising a memory subsystem 326 and a file storage subsystem 328, user interface input devices 322, user interface output devices 320, and a network interface subsystem 316. The input and output devices allow user interaction with network node 202. Network interface subsystem 316 provides an interface to outside network 218 and is coupled via network 218 to other elements in a data processing system. The physical hardware components of network interfaces are sometimes referred to as network interface cards (NICs), although they need not be in the form of cards; for instance they could be in the form of integrated circuits (ICs) and connectors fitted directly onto a motherboard, or in the form of macrocells fabricated on a single integrated circuit chip with other components of the computer system.

User interface input devices 322 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into network node 202 or onto network 218.

User interface output devices 320 may include a display subsystem, a printer, a fax machine, or nonvisual displays such as audio output devices. The display subsystem may include a cathode ray tube (CRT), a flat panel device such as a liquid crystal display (LCD), a projection device, or some other mechanism for creating a visible image. The display subsystem may also provide a nonvisual display such as via audio output devices. In general, use of the term "output device" is intended to include all possible types of devices and ways to output information from network node to the user or to another machine or network node. In particular, an output device of the network node on which the e-book engagement system is implemented, may include a visual output informing a user of action recommendations made by the system, or may include a communication device for communicating action signals.

Storage subsystem 324 stores the basic programming and data constructs that provide the functionality of certain embodiments of the present invention. For example, the various modules implementing the functionality of certain embodiments of the invention may be stored in storage subsystem 324. These software modules are generally executed by processor subsystem 314.

Memory subsystem 326 typically includes a number of memories including a main random access memory (RAM) 330 for storage of instructions and data during program execution and a read-only memory (ROM) 332 in which fixed instructions are stored. File storage subsystem 328 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer-readable medium such as one or more CD-ROMs, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed. The databases and modules implementing the functionality of certain embodiments of the invention may also be stored by file storage subsystem 328. The host memory subsystem 326 contains, among other things, computer instructions which, when executed by the processor subsystem 314, cause the computer system to operate or perform functions as described herein. As used herein, processes and software that are said to run in or on "the host," "the computer" or "the network," execute on the processor subsystem 314 in response to computer instructions and data in the host memory subsystem 326 including any other local or remote storage for such instructions and data.

Bus subsystem 312 provides a mechanism for letting the various components and subsystems of network node 202 communicate with each other as intended. Although bus subsystem 312 is shown schematically as a single bus, alternative embodiments of the bus subsystem may use multiple busses.

A network node can be of varying types including a personal computer, a portable computer, smart phone, tablet computer, a workstation, a computer terminal, a network computer, a television, a mainframe, a server farm, a widely-distributed set of loosely networked computers, or any other data processing system or user device. Due to the ever-changing nature of computers and networks, the description of network node depicted in FIG. 19 is intended only as a specific example for purposes of illustrating the preferred embodiments of the present invention. Many other configurations of network node are possible having more or less components than the system depicted in FIG. 19.

In some embodiments, in addition, one or more of the server application, the supervisor application, and the reader application can be implemented in the network node as a Software-as-a-Service (SaaS) application, a web-architected application or a cloud-delivered service. Examples of common SaaS applications today include Salesforce.com™, Box™, Dropbox™, Google Apps™, Amazon Web Services AWS™, Microsoft Office 365™, Workday™, Oracle on Demand™, Taleo™, Yammer™, and Concur™. SaaS applications provide functionalities to users that are implemented in the cloud, and that are the target of policies, e.g., logging in, editing user information, updating whitelists, deleting contacts from the contact list, in contrast to the offerings of simple websites and e-commerce sites. Note that an SaaS application can be supported by both web browser clients and application clients that use URL-based APIs (application programming interfaces).

FIGS. 20-31 are briefly described above, and not described again. These user interface images illustrate procedures executed by the editor application, during intake of an electronic document and configuration with engagement container metadata and engagement data as described herein.

A number of flowcharts illustrating logic executed by aspects of the electronic document engagement and presentation system are set forth herein. For all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for managing by a child-controlled client application, engagement with, and presentation of, content of electronic documents, identified by one or more client account records stored by a server for client accounts that have been enabled by the server under supervision of a parent-controlled supervisor application, the method comprising:

receiving, at the child-controlled client application, an input of verification code from a client user, wherein anonymity of the client user is to be preserved;

sending to the server, a login request providing the verification code to login the child-controlled client application to a particular client account of a set of client accounts, wherein the set of client accounts has been enabled on the server by, and is under supervision of, the parent-controlled supervisor application;

receiving by the child-controlled client application, in response to the login request providing the verification code, authorized access to the particular client account, said authorized access: (i) authorizing the child-controlled client application to access the one or more client account records for storing identifiers of electronic documents assigned to the particular client account, and (ii) securely linking the child-controlled client application to the server while preserving anonymity, with respect to the server, of the client user;

retrieving from the server, by the child-controlled client application, a set of electronic documents made available to the child-controlled client application by the parent-controlled supervisor application for assignment to the client accounts under supervision of a user of the parent-controlled supervisor application while preserving anonymity, with respect to the server, of the client user during the retrieval;

receiving, by the child-controlled client application, a selection of a particular electronic document assigned to the particular client account;

providing content from the particular electronic document; and displaying progress of the client user based on the particular electronic document.

2. The method of claim 1, further including: utilizing different access authorization procedures for a supervisor account than for the one or more client account records under supervision of the supervisor account.

3. The method of claim 1, further including: the child-controlled client application providing a pseudonym used to identify the client user on login.

4. The method of claim 1, wherein the verification code is generated by a processor executing instructions.

5. The method of claim 1, wherein the verification code is required at an initial login by the child-controlled client application.

6. The method of claim 1, further including: sending by the child-controlled client application a request for additional electronic documents to be assigned to the particular client account.

7. The method of claim 1, further including: receiving from the server for display, an indication of the progress of a student user of the child-controlled client application through assigned electronic documents.

8. The method of claim 7, wherein the progress is based on engagement with an electronic document by the child-controlled client application.

9. The method of claim 8, wherein the progress is based on a quantity of engagement.

10. The method of claim 1, further including: automatically entering the verification code into a reader application login procedure when switching between child and parent controlled applications.

11. The method of claim 1, further including: receiving from the server, instructions to prevent access by the particular client account; and responsively blocking access to one or more electronic documents.

12. A non-transitory computer readable memory storing instructions for managing by a child-controlled client application, engagement with, and presentation of, content of electronic documents identified by one or more client account records stored by a server for client accounts that have been enabled by the server under supervision of a parent-controlled supervisor application, which instructions when executed by one or more processors perform actions comprising:

receiving, at the child-controlled client application, an input of verification code from a client user, wherein anonymity of the client user is to be preserved;

sending to the server, a login request providing the verification code to login the child-controlled client application to a particular client account of a set of client accounts, wherein the set of client accounts has been enabled on the server by, and is under supervision of, the parent-controlled supervisor application;

receiving by the child-controlled client application, in response to the login request providing the verification code, authorized access to the particular client account, said authorized access: (i) authorizing the child-controlled client application to access the one or more client account records for storing identifiers of electronic documents assigned to the particular client account, and (ii) securely linking the child-controlled client application to the server while preserving anonymity, with respect to the server, of the client user;

retrieving from the server, by the child-controlled client application, a set of electronic documents made available to the child-controlled client application by the parent-controlled supervisor application for assignment to the client accounts under supervision of the parent-controlled supervisor application while preserving anonymity, with respect to the server, of the client user during the retrieval;

receiving, by the child-controlled client application, a selection of a particular electronic document assigned to the particular client account;

providing content from the particular electronic document; and displaying progress of the client user based on the particular electronic document.

13. The non-transitory computer readable memory of claim 12, further including: utilizing different access authorization procedures for a supervisor account than for the one or more client account records under supervision of the supervisor account.

14. The non-transitory computer readable memory of claim 12, further including: the child-controlled client application providing a pseudonym used to identify the client user on login.

15. The non-transitory computer readable memory of claim 12, wherein the verification code is generated by a processor executing instructions.

16. The non-transitory computer readable memory of claim 12, wherein the verification code is required only at an initial login by the child-controlled client application.

17. The non-transitory computer readable memory of claim 12, further including: sending by the child-controlled client application a request for additional electronic documents to be assigned to the particular client account.

18. The non-transitory computer readable memory of claim 12, further including: receiving from the server for display, an indication of the progress of a child user of the child-controlled client application through assigned electronic documents.

19. The non-transitory computer readable memory of claim 12, wherein the progress is based on engagement with an electronic document by the child-controlled client application.

20. The non-transitory computer readable memory of claim 12, further including: automatically entering the verification code into a reader application login procedure when switching between child and parent controlled applications.

21. The non-transitory computer readable memory of claim 12, further including: receiving from the server, instructions to prevent access by the particular client account; and responsively blocking access to one or more electronic documents.

22. A system, comprising:

one or more network nodes, where a network node of the one or more network nodes includes a communication interface, one or more processors and memory accessible by the processor or processors, the one or more network nodes configured for execution of a method for managing by a child-controlled client application, engagement with, and presentation of, content of electronic documents identified by one or more client account records stored by a server for client accounts that have been enabled by the server under supervision of a parent-controlled supervisor application, including performing actions comprising:

receiving, at the child-controlled client application, an input of verification code from a client user, wherein anonymity of the client user is to be preserved;

sending to the server, a login request providing the verification code to login the child-controlled client application to a particular client account of a set of client accounts, wherein the set of client accounts has been enabled on the server by, and is under supervision of, the parent-controlled supervisor application;

receiving by the child-controlled client application, in response to the login request providing the verification code, authorized access to the particular client account, said authorized access: (i) authorizing the child-controlled client application to access the one or more client account records for storing identifiers of electronic documents assigned to the particular client account, and (ii) securely linking the child-controlled client application to the server while preserving anonymity, with respect to the server, of the client user;

retrieving from the server, by the child-controlled client application, a set of electronic documents made available to the child-controlled client application by the parent-controlled supervisor application for assignment to the client accounts under supervision of the parent-controlled supervisor application while preserving anonymity, with respect to the server, of the client user during the retrieval;

receiving, by the child-controlled client application, a selection of a particular electronic document assigned to the particular client account;

providing content from the particular electronic document; and displaying progress of the client user based on the particular electronic document.

* * * * *